(12) United States Patent
Kleefisch

(10) Patent No.: US 11,098,774 B2
(45) Date of Patent: Aug. 24, 2021

(54) SYSTEM AND METHOD FOR ELECTRO-MAGNETIC APPLIED FRICTION BRAKING IN A RADIO CONTROLLED MODEL CAR

(71) Applicant: Ryan Kleefisch, Lancaster, CA (US)

(72) Inventor: Ryan Kleefisch, Lancaster, CA (US)

(73) Assignee: Ryan Kleefisch ProStar RC Products, Lancaster, CA (US)

( * ) Notice: Subject to any disclaimer, the term of this patent is extended or adjusted under 35 U.S.C. 154(b) by 200 days.

(21) Appl. No.: 16/400,608

(22) Filed: May 1, 2019

(65) Prior Publication Data
US 2020/0347895 A1 Nov. 5, 2020

(51) Int. Cl.
| | |
|---|---|
| *F16D 63/00* | (2006.01) |
| *B60T 8/17* | (2006.01) |
| *B60T 1/06* | (2006.01) |
| *F16D 65/18* | (2006.01) |
| *F16D 55/02* | (2006.01) |
| *F16D 121/20* | (2012.01) |

(52) U.S. Cl.
CPC ............ *F16D 63/002* (2013.01); *B60T 1/065* (2013.01); *B60T 8/17* (2013.01); *F16D 55/02* (2013.01); *F16D 65/186* (2013.01); *F16D 2121/20* (2013.01)

(58) Field of Classification Search
CPC . B60T 1/065; B60T 8/17; B60T 8/172; F16D 55/02; F16D 55/224; F16D 63/00; F16D 63/002; F16D 65/186; F16D 2121/20; F16F 9/53; F16F 2224/045
See application file for complete search history.

(56) References Cited

U.S. PATENT DOCUMENTS

| | | | | |
|---|---|---|---|---|
| 3,659,170 | A * | 4/1972 | Burkett | H02K 7/1026 318/372 |
| 4,684,838 | A * | 8/1987 | Casanova | F16D 55/28 188/171 |
| 6,536,561 | B1 * | 3/2003 | Keller | B60T 1/062 188/162 |
| 2010/0038189 | A1 * | 2/2010 | Tarasinski | F16D 55/02 188/31 |
| 2010/0295284 | A1 * | 11/2010 | Mannebach | B60R 21/38 280/748 |
| 2013/0192934 | A1 * | 8/2013 | Knop | F16D 63/002 188/72.3 |
| 2015/0122607 | A1 * | 5/2015 | Vogel | B60L 7/28 192/35 |
| 2015/0184704 | A1 * | 7/2015 | Aschoff | H01F 7/081 188/162 |

* cited by examiner

*Primary Examiner* — William V Gilbert

(57) ABSTRACT

A system and method having a magnetic brake apparatus configured to be operable for slowing or stopping motion with magnetic or electromagnetic force. An electromagnetic coil appliance generates the magnetic or electromagnetic force when power is applied to the electromagnetic coil appliance. A brake control module is configured to be operable for controlling the magnetic brake apparatus. A controller implement of the brake control module is configured to be operable for processing a program instruction to control an operation of the magnetic brake apparatus where a full-bridge driver coupled to the controller implement, applies power the electromagnetic coil appliance. A receiver device is configured to supply a control signal to the controller implement.

19 Claims, 28 Drawing Sheets

4WD CONFIGURATION

4WD CONFIGURATION

SYSTEM AND METHOD FOR ELECTRO-MAGNETIC APPLIED FRICTION BRAKING IN A RADIO CONTROLLED MODEL CAR

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to vehicle disc brakes. More particularly, certain embodiments of the invention relate to magnetic disc brake controllers provided in radio control (RC) model vehicle, magnetic brake apparatus, system, and methods.

BACKGROUND OF THE RELEVANT PRIOR ART

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that the current Radio control (RC) engine powered vehicles have various subsystems, one being the brake system. Currently, the types of brake systems in RC model vehicles may include rotary servo-actuated mechanical brakes and servo-actuated hydraulic brakes. These types of brake systems may have certain drawbacks. For example, mechanical brakes may include a complex arrangement of rotary control servos connected to mechanical members, such as rods, arms, cams, levers, springs, plates, screws, nuts, brake pads, disc/rotors, and the like. Any adjustments, such as brake bias and braking strength, may be mechanical in nature, which is a slow process and relies on trial and error to adjust. Generally, mechanical and/or hydraulic brake systems in RC model vehicles operate inefficiently resulting in poor braking control and response.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
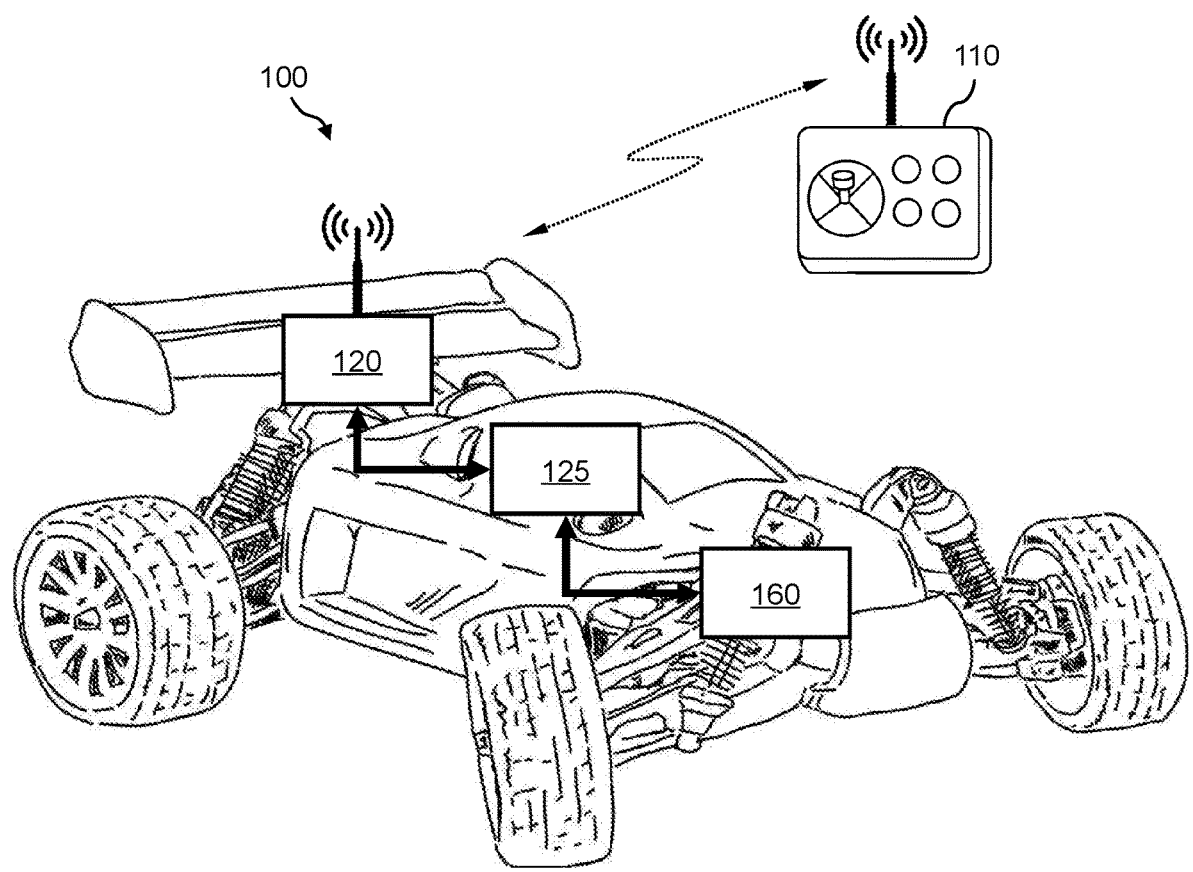
FIG. 1 is an illustration of an exemplary remote controlled magnetically-braked RC model vehicle, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used, to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a magnetic-disc brake-equipped radio control (RC) model vehicle, magnetic brake apparatus, system, and methods.

Magnetically-braked RC model vehicle may include a magnetic brake apparatus that is based on electromagnetic brake technology (also called electro-mechanical brakes or EM brakes, electric brakes, electromagnetic brakes, and electromagnetic friction brakes). Namely, electromagnetic brakes slow or stop motion using electromagnetic force to apply mechanical resistance (friction). In one example, the presently disclosed magnetic brake apparatus includes a bulkhead housing, a pot-shaped magnet arranged with respect to an electromagnetic coil, a friction disc (or pad), and a magnetically responsive brake disc.

In some embodiments, the presently disclosed magnetically-braked RC model vehicle includes four magnetic brake apparatuses; namely, one brake apparatus at each wheel. In other embodiments, the magnetically-braked RC model vehicle includes a pair of magnetic brake apparatuses integrated with other assemblies. For example, a pair of magnetic brake apparatuses integrated with a differential assembly, a gearbox assembly, a transmission assembly, a motor assembly, and the like, and wherein the pair of magnetic brake apparatuses can provide a front and rear brake mechanism in one example or independent braking in another example.

In some embodiments, the presently disclosed magnetically-braked RC model vehicle provides magnetic brake control electronics that is driven by one channel of the RC transmitter. In other embodiments, the magnetically-braked RC model vehicle provides magnetic brake control electronics that is driven by two channels of the RC transmitter. In yet other embodiments, the magnetically-braked RC model vehicle provides magnetic brake control electronics that is selectable between one-channel control and two-channel control.

In some embodiments, the magnetic brake control electronics of the presently disclosed magnetically-braked RC model vehicle provides means for reducing or entirely eliminating any remanent magnetic field in the magnetic brake apparatus and thereby ensuring that the brake disc disengages from the magnet and further ensuring good braking control and response.

In some embodiments, the face of the electromagnet is set at a slight tilt or angle with respect to the spinning brake disc. When a voltage is applied, the face of the brake disc pulls against the slightly tilted face of the electromagnet and rotation stops or slows. Then, when the voltage is released, the brake disc tends to pull away from the magnet because of the gyroscopic nature of the disc while spinning. The tilted electromagnet configuration further ensures that the brake disc disengages from the magnet and further ensures good braking control and response.

In some embodiments, the magnetic brake control electronics of the presently disclosed magnetically-braked RC model vehicle provides means for digitally and/or electronically controlling and/or adjusting the brake bias.

Further, a method of using the presently disclosed magnetically-braked RC model vehicle that includes at least one magnetic brake apparatus is provided.

Further, the presently disclosed magnetically-braked RC model vehicle provides a simple, low-cost, and easy to maintain brake apparatus as compared with conventional mechanical and/or hydraulic brake systems used in RC model vehicles.

Further, in other embodiments, the presently disclosed magnetic brake apparatus can be retrofitted into existing RC model vehicles.

The present invention will now be described in detail with reference to embodiments thereof as illustrated in the accompanying drawings.

FIG. 1 is an illustration of an exemplary remote controlled magnetically-braked RC model vehicle, in accordance with an embodiment of the present invention. In the present embodiment shown, a magnetically-braked RC model vehicle 100 may include an RC car. The magnetically-braked RC model vehicle 100 may be any type of radio-controlled and wheeled vehicle, such as an RC car, RC truck, RC buggy, and the like. Generally, the magnetically-braked RC model vehicle 100 may be an RC hobby vehicle, an RC racing vehicle, an RC rock crawler vehicle, an RC on-road vehicle, an RC off-road vehicle, and the like. Further, a magnetically-braked RC model vehicle 100 may be, for example, an electric-powered, model engine nitro-powered, or gasoline-powered RC model vehicle. The magnetically-braked RC model vehicle 100 may be any scale size, such as, but not limited to, a scale size of approximately 1/76, 1/64, 1/48, 1/43, 1/32, 1/20, 1/18, 1/16, 1/12, 1/10, 1/8, 1/6, 1/5, 1/4, and the like.

The magnetically-braked RC model vehicle 100 is paired in wireless fashion with a radio transmitter 110. The radio transmitter 110 may be any standard multi-channel radio transmitter that is used with any RC model vehicles. The magnetically-braked RC model vehicle 100 and the radio transmitter 110 may operate using standard frequency ranges used for RC model vehicles, such as the Citizens Band (CB) of 27-75 MHz and the industrial, scientific, medical (ISM) radio band of, for example, 2.4 GHz or 5.8 Ghz, and/or any other signal technology.

In one example, the magnetically-braked RC model vehicle 100 may include a receiver 120, which may be a radio receiver that is paired with the radio transmitter 110. The receiver 120 is in communication with the magnetic brake control electronics 125 that may be electrically connected to at least one magnetic brake apparatus 160. More details of examples of the magnetic brake control electronics 125 are shown and described with reference to FIG. 4, FIG. 5, FIG. 6, FIG. 7, and FIG. 8A and FIG. 8B. Further, more details of examples of magnetic brake apparatus 160 are shown and described with reference to FIG. 2 through FIG. 16.

The presently disclosed magnetically-braked RC model vehicle 100 may include one or more magnetic brake apparatuses 160 depending on the drive configuration of the magnetically-braked RC model vehicle 100. For example, the magnetically-braked RC model vehicle 100 may be an all-wheel drive (AWD) vehicle, a four-wheel drive (4WD) vehicle, or a two-wheel drive (2WD) vehicle (e.g., a rear-wheel drive (RWD) vehicle or a front-wheel drive (FWD) vehicle). Additionally, because the scale size of the magnetically-braked RC model vehicle 100 may vary, the size and/or braking force of the presently disclosed magnetic brake apparatus 160 may be scaled to correspond to the scale size of the magnetically-braked RC model vehicle 100 in which it is installed.

The magnetically-braked RC model vehicle 100 may include other subsystems (not shown) typically found in RC model vehicles. Examples of other subsystems may include, but are not limited to, motor or engine systems, steering systems, differential systems, gearboxes, transmissions, suspension systems, cooling systems, other electrical control systems, and the like.

The presently disclosed magnetic brake apparatus 160 may be based on electromagnetic brake technology (also called electro-mechanical brakes or EM brakes, electric brakes, electromagnetic brakes, and electromagnetic friction brakes). Namely, electromagnetic brakes slow or stop motion using electromagnetic force to apply mechanical resistance (friction).

Figure 2:
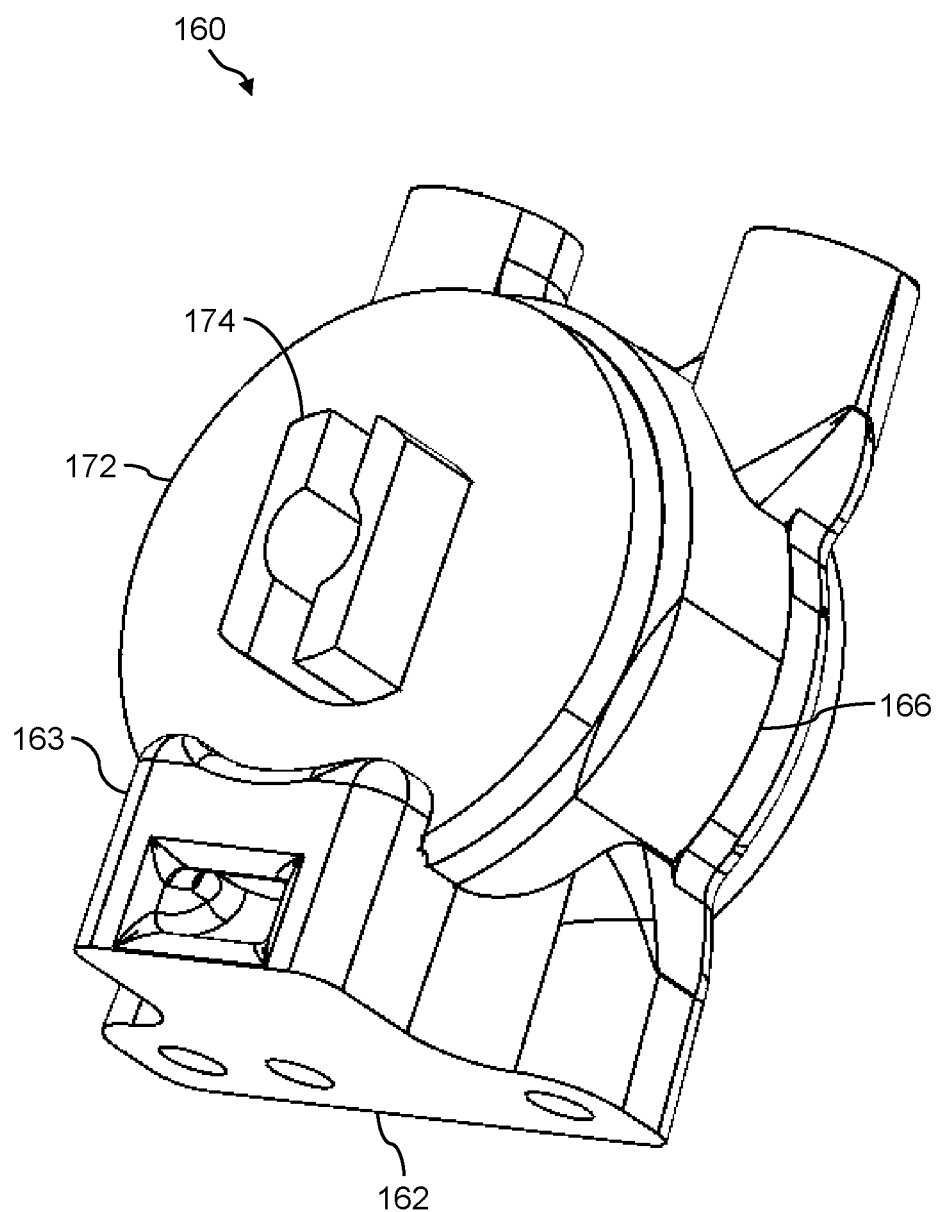
FIG. 2 is an illustration of an exemplary magnetic brake apparatus, in accordance with an embodiment of the present invention.
Figure 3A:
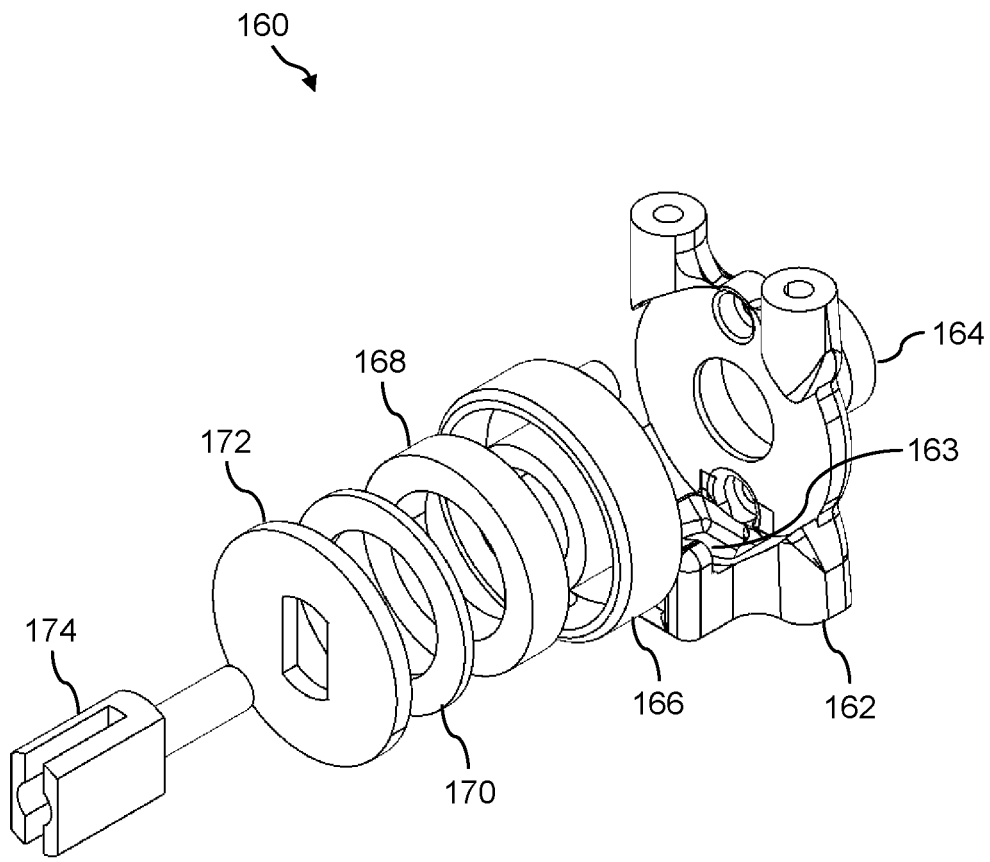
FIGS. 3A and 3B illustrate exploded views of an exemplary magnetic brake apparatus, in accordance with an embodiment of the present invention.
Figure 3B:
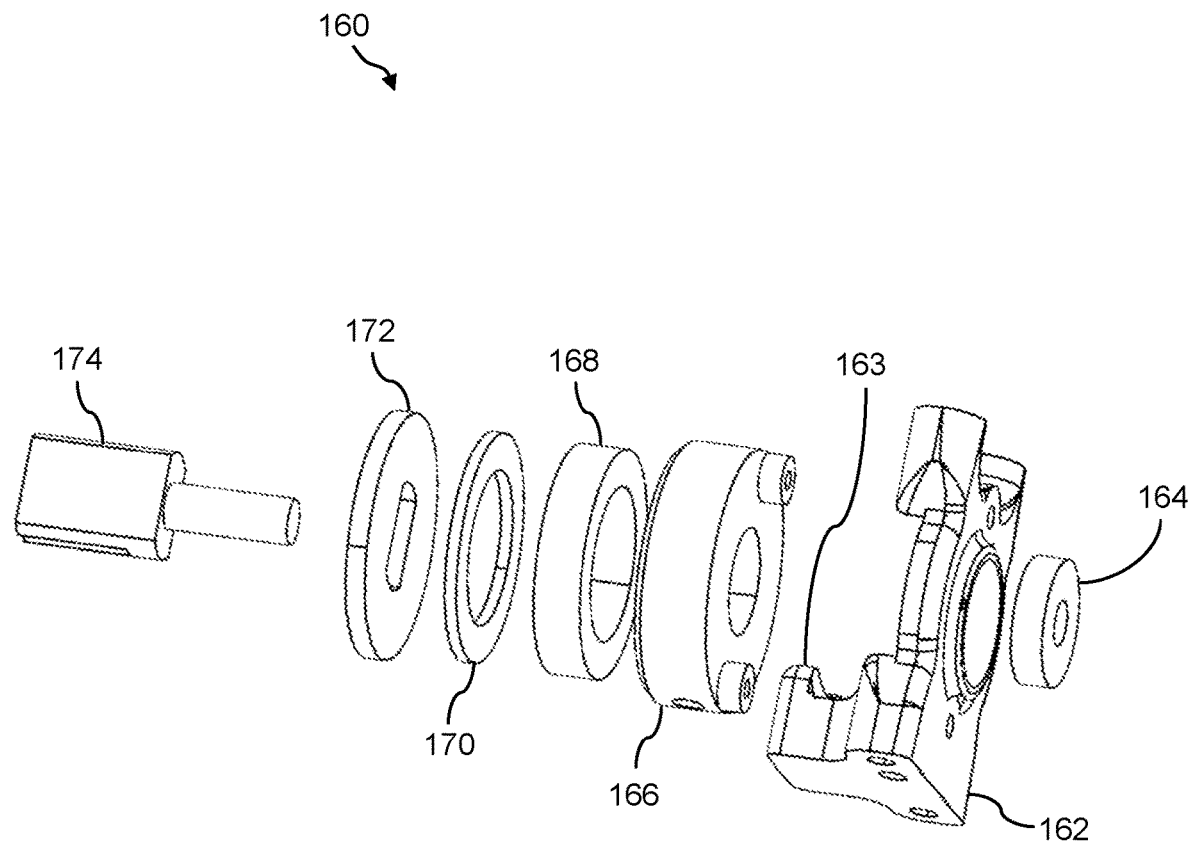

FIG. 2 and FIG. 3 illustrate a perspective view and exploded views of an exemplary magnetic brake apparatus, in accordance with an embodiment of the present invention. In the present embodiment shown, the magnetic brake apparatus 160 may include a bulkhead housing 162 that further includes a disc guide 163, a bearing 164, a pot magnet 166 (i.e., a pot-shaped magnet) arranged with respect to an electromagnetic coil 168, a friction disc (or pad) 170, a brake disc 172, and an outdrive coupler 174. In this example, the bulkhead housing 162 includes any features for mounting the magnetic brake apparatus 160 within the magnetically-braked RC model vehicle 100. Further, in this example, the disc guide 163 is molded or integrated directly into the bulkhead housing 162. However, in other examples, the disc guide 163 may be a separate component that is coupled to the bulkhead housing 162.

The pot magnet 166 and the electromagnetic coil 168 seat into the bulkhead housing 162. Together, the pot magnet 166 and the electromagnetic coil 168 form an electromagnet in the magnetic brake apparatus 160 that is activated and controlled via the magnetic brake control electronics 125. The magnetic field that is generated using the pot magnet 166 and the electromagnetic coil 168 is used to pull the brake disc 172 against the surfaces of the pot magnet 166 and the electromagnetic coil 168. The friction disc (or pad) 170 is arranged between the brake disc 172 and the pot magnet 166 and the electromagnetic coil 168. The friction disc (or pad) 170 can be formed, for example, of ceramic and/or organic friction brake pad materials. The brake disc 172 is a magnetically responsive brake disc. Both the pot magnet 166 and the brake disc 172 are formed of ferromagnetic material, such as, but not limited to, 100% iron, steel, iron alloys, and/or other magnetically responsive materials.

When no power is applied to the electromagnetic coil 168, no magnetic field (flux) is present and therefore there can be a small air gap between the brake disc 172 and the face of the pot magnet 166 and electromagnetic coil 168. When power is applied to the electromagnetic coil 168, a magnetic field (flux) is created between the pot magnet 166 and the brake disc 172. This magnetic attraction pulls the brake disc 172 in contact with the face of the pot magnet 166 and electromagnetic coil 168. The friction (assisted by friction disc 170) and the strength of the magnetic field is what causes the rotational motion of the brake disc 172 to stop or slow depending on the strength of the flux applied throughout the electromagnetic coil 168 per the magnetic brake control electronics 125. The maximum strength of the magnetic field can be determined by the design, shape, and/or size of the pot magnet 166 and/or the design, shape, and/or size of the electromagnetic coil 168.

The specific implementation of the magnetic brake apparatus 160 may vary depending on, for example, the type, size, brake configuration, and/or any other characteristics of the magnetically-braked RC model vehicle 100 in which it is installed. For example, more details of an example of a pair of the magnetic brake apparatuses 160 integrated with a differential system are shown and described herein below with reference to FIG. 9 through FIG. 22.

Figure 4:
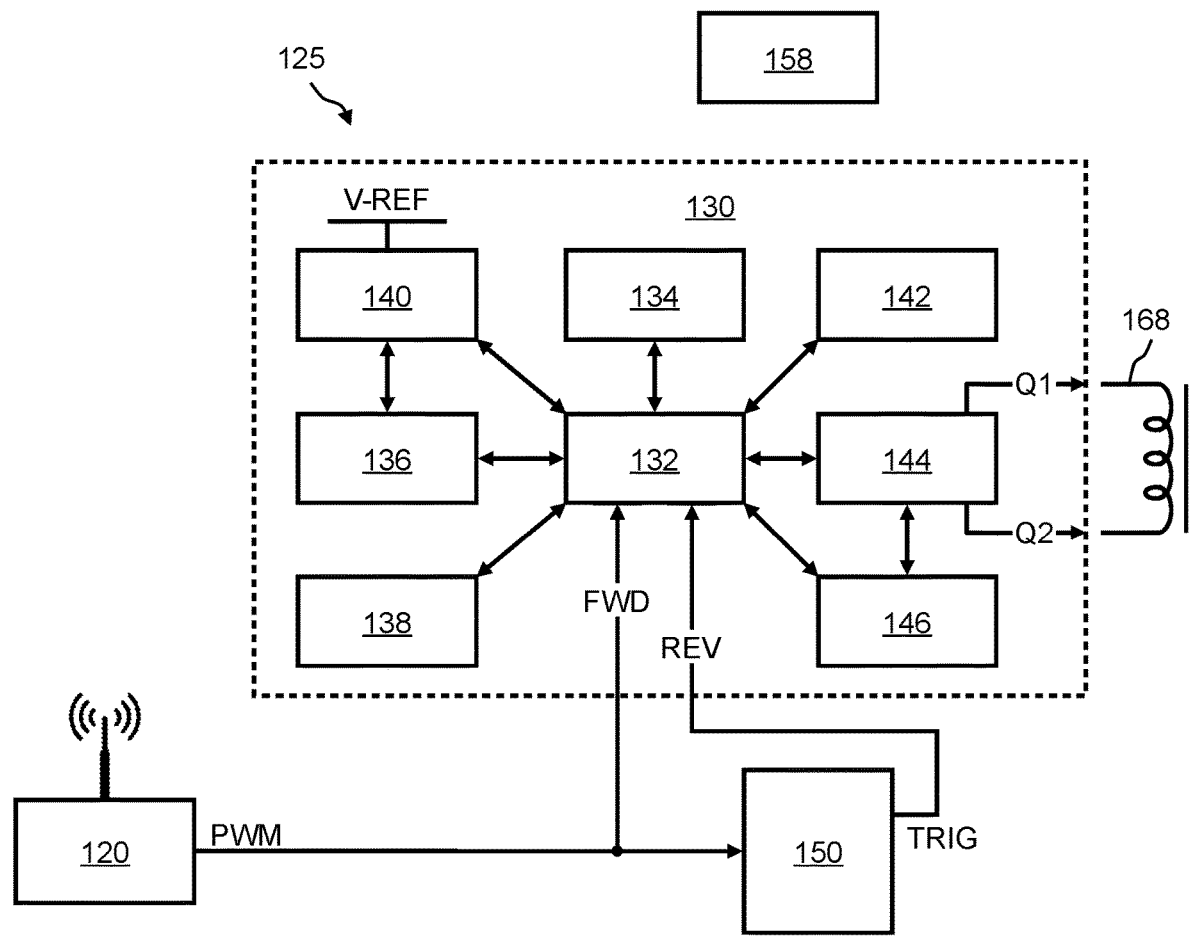
FIG. 4 is an illustration of an exemplary control electronics for controlling a magnetic brake apparatus, in accordance with an embodiment of the present invention.

FIG. 4 is an illustration of an exemplary magnetic brake control electronics for controlling a magnetic brake apparatus, in accordance with an embodiment of the present invention. In the present embodiment shown, the magnetic brake control electronics 125 may include a brake control module 130 that may be operated using a controller 132. The brake control module 130 may be implemented, for example, but not a limitation, as a printed circuit board (PCB), a programmable logic device, a processor, etc.

The controller 132 is in communication with, for example, certain standby logic 134, certain voltage protection 136, certain thermal protection 138, a voltage reference (V-REF) 140, certain duty control 142, a full-bridge driver 144 for driving the electromagnetic coil 168 of the magnetic brake apparatus 160 (see FIG. 2 and FIG. 3), and certain over-current protection 146. Further, receiver 120 supplies a Pulse Width Modulation (PWM) signal to a forward polarity (FWD) input of the controller 132 of the brake control module 130. Alternatively, receiver 120 supplies, but not limited to, data or analog control signal to a forward polarity (FWD) input of the controller 132 of the brake control module 130. The PWM signal from receiver 120 also supplies a reverse polarity trigger 150. Further, a trigger (TRIG) output of reverse polarity trigger 150 supplies a reverse polarity (REV) input of controller 132. The pwm signal from the receiver sends a reverse signal for braking and a forward signal to control reverse polarity to remove remenance.

The controller 132 can be any standard controller or microprocessor that is capable of processing program instructions. The controller 132 serves to provide processing capabilities, such as storing, interpreting, and/or executing software instructions, as well as controlling the overall operations of the brake control module 130. For example, the controller 132 may be coupled to a programmable logic device programmed with the software control instructions. In another example, the controller 132 may be coupled to a memory device storing the software control instructions. The software control instructions may comprise of several modules. Each software module performing a specific control function.

Sleep mode, sometimes called standby, suspend, or inactive mode, is a power-saving state that the brake control module 130 can enter when not in use. The standby logic 134 can be any standard control logic for managing the sleep mode of any computing device or other types of devices. For example, the standby logic 134 can be used to either manually or automatically invoke sleep mode when the brake control module 130 is not in use. Conversely, the standby logic 134 is used to "wake" the brake control module 130 when ready for use.

The voltage protection 136 monitors the power supply voltage at the controller 132 and provides both under voltage protection and over voltage protection. For example, using the voltage protection 136, when the power supply voltage at the controller 132 falls below about 3 VDC, then the operation of the controller 132 is suspended. Similarly, for example, when the power supply voltage at the controller 132 rises above about 18 VDC, then the operation of the controller 132 is suspended.

The thermal protection 138 provides thermal shut down protection in order to prevent the controller 132 and/or the brake control module 130 from overheating. V-REF 140 provides an analog voltage reference that can be distributed to various devices and/or components of the brake control module 130. For example, V-REF 140 can be used to ensure stable power inside the controller 132, which may be, for example, a CMOS integrated circuit chip. The duty control 142 provides an analog DC voltage input to the controller 132, wherein this DC voltage is used to control the duty cycle of the internal PWM built into the controller 132.

The full-bridge driver 144 is, for example, an H-bridge driver that is designed for the control of small DC motors and inductive loads. In the magnetically-braked RC model vehicle 100, the full-bridge driver 144 is used to drive an electromagnetic coil 168 of the magnetic brake apparatus 160 (see FIG. 2 and FIG. 3). Namely, the full-bridge driver 144 is the output stage of the brake control module 130 that delivers power to the output pins of the brake control module 130. The over-current protection 146 is programmed with a peak current limit that is used to provide over-load protection within the brake control module 130. For example, the over-current protection 146 is used to monitor the current drawn by the full-bridge driver 144. If the amount of current exceeds the peak current limit, then the controller 132 is used to suspend the operation of the full-bridge driver 144.

The reverse polarity trigger 150 is a reverse polarity pulse trigger that detects the presence of PWM input from the receiver 120. Namely, multiple channels are transmitted between the radio transmitter 110 and the receiver 120 of the magnetically-braked RC model vehicle 100. In one example, there is a steering channel, a throttle/brake channel, and a miscellaneous channel. In the magnetic brake control electronics 125, the throttle/brake channel supplies the PWM signal to the controller 132 of the brake control module 130 and to the reverse polarity trigger 150.

Both the controller 132 and the reverse polarity trigger 150 are used to detect the presence and absence of the braking PWM signal. Namely, when the PWM signal is present at the FWD input of the controller 132, a braking cycle of the magnetic brake apparatus 160 occurs. By contrast, when the PWM signal is not present, no braking occurs via the magnetic brake apparatus 160. Further, the characteristics of the PWM signal determine the degree of braking (i.e., the braking force). Namely, whenever the controller 132 detects the presence of the braking PWM signal at its FWD input, a positive DC voltage is generated between outputs Q1 and Q2 of the full-bridge driver 144. This positive DC voltage drives the electromagnetic coil 168 of the magnetic brake apparatus 160 and braking occurs for the duration of the braking PWM signal. Namely, the controller 132 processes the braking PWM signal to control the degree of braking force generated by the magnetic brake apparatus 160.

Remanence or remanent magnetization or residual magnetism is the magnetization left behind in a ferromagnetic material (such as iron) after an external magnetic field is removed. At the end of the braking cycle, a remanent magnetic field can be left behind in the electromagnet mechanism of the magnetic brake apparatus 160. The purpose of the reverse polarity trigger 150 is to reduce or entirely eliminate this remanent magnetic field in the magnetic brake apparatus 160 and thereby ensure that the brake disc disengages from the magnet and further ensures good braking control and response.

The reverse polarity trigger 150 also detects the presence of the braking PWM signal. Again, the TRIG output of the reverse polarity trigger 150 supplies the REV input of the controller 132. When the braking PWM signal is present, the TRIG output of the reverse polarity trigger 150 is not active. However, when the braking PWM signal is not present, the TRIG output of the reverse polarity trigger 150 is active. When TRIG at the REV input of the controller 132 switches from inactive to active at the end of the PWM signal, a reverse polarity voltage (i.e., a pulse or continuous) is applied to the electromagnetic coil 168 of the magnetic brake apparatus 160. The application of this reverse polarity voltage or pulse reduces or entirely eliminates any remanent magnetic field in the magnetic brake apparatus 160 and readies the magnetic brake apparatus 160 for the next braking cycle. More details of the operation of the controller 132 with respect to the presence and absence of the braking PWM signal (at FWD input of the controller 132) and TRIG (at REV input of the controller 132) are shown and described with reference to FIG. 5.

In the brake control module 130 of the magnetic brake control electronics 125, a regulated power is provided from a battery source (not shown) in the receiver 120 to ensure stable and linear operation of the circuitry and of the power distributed to the magnetic brake apparatus 160. Digital power control is provided to control the output (e.g., the full-bridge driver 144) of the brake control module 130 where the voltage limit is defined using the input PWM signal. In another example, instead of the brake control module 130 being dependent on the power source of the receiver 120, the brake control module 130 is powered independently. Namely, the brake control module 130 may include a battery source that is separate from the receiver 120.

The brake control module 130 of the magnetic brake control electronics 125 may include programmable logic devices and/or memory devices for storing software control program. The software control program may comprise of several modules, each software module performing a corresponding control function. The software control module may include a standby logic module, a voltage protection module, a thermal protection module, a duty control module, a full-bridge driver module, an over-current protection module, and a reverse polarity trigger module (See FIG. 26). The software control program may be, but not a limitation, a stand-alone software program. The software control program may have, but not a limitation.

Figure 5:
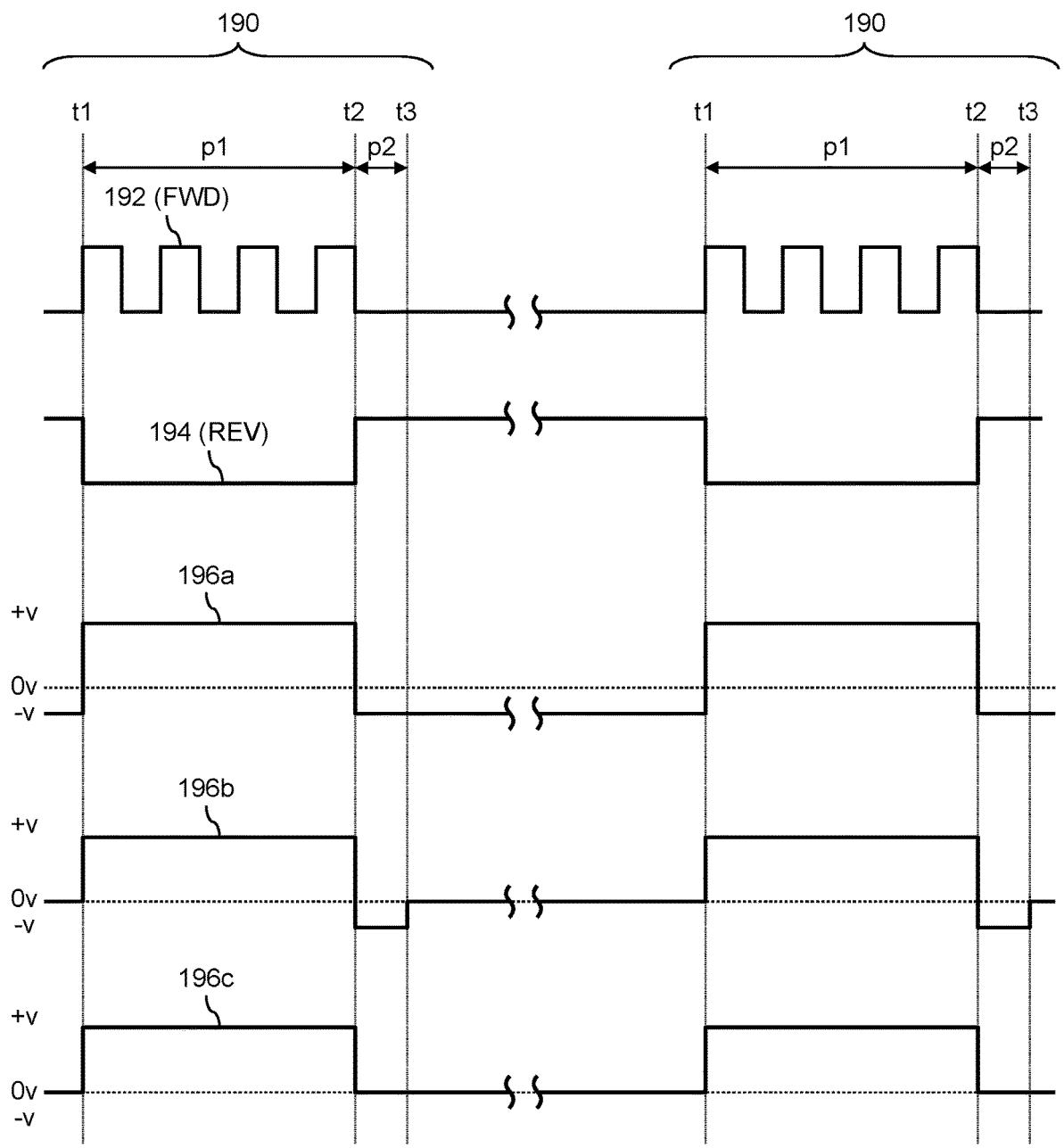
FIG. 5 shows exemplary plots of various signal waveforms with respect to operating a magnetic brake apparatus, in accordance with an embodiment of the present invention.

FIG. 5 shows exemplary plots of various signal waveforms with respect to operating a magnetic brake apparatus, in accordance with an embodiment of the present invention. The exemplary plots show two braking cycles 190 separated by any amount of dead time. Each braking cycle 190 begins at a time t1, followed by a time t2, and ends at a time t3. For example, a waveform 192 is the FWD input of the controller 132, which is the braking PWM signal from the receiver 120 and wherein the amplitude and duty cycle of the braking PWM signal can vary. The time t1 is the beginning or starting time of the braking PWM signal. The time t2 is the ending time of the braking PWM signal. The portion of the braking cycle 190 between the time t1 and the time t2 is a portion p1 of the braking cycle 190.

A waveform 194 is the REV input of the controller 132, which is the TRIG output signal of the reverse polarity trigger 150. The TRIG output is inactive (e.g., a logic zero) between the time t1 and the time t2, which is the portion p1 of the braking cycle 190. The TRIG output is active (e.g., a logic one) between the time t2 of the first braking cycle 190 and the time t1 of the next braking cycle 190. That is, the TRIG output is active (e.g., a logic one) during the dead time when the braking PWM signal is absent.

The controller 132 can be programmed to process the braking PWM signal at its FWD input and the TRIG signal at its REV input in various ways to produce various output voltages at the full-bridge driver 144. In one example and referring now to the waveform 196a shown in FIG. 5, the full-bridge driver 144 provides a positive DC voltage (+V) between the time t1 and the time t2 when the braking PWM signal is present at FWD and TRIG is inactive (e.g., a logic zero) at REV. The positive DC voltage (+V) can be, for example, from about +7.4 VDC to about +1 VDC. Then and still referring to the waveform 196a, at the time t2 when the braking PWM signal ends and TRIG switches to active (e.g., switches to a logic one), the output of the full-bridge driver 144 switches from the positive DC voltage (+V) to a slightly negative DC voltage (−V). The negative DC voltage (−V) can be, for example, from about −0.01 VDC to about −1 VDC. In this example, the negative DC voltage (−V) is held substantially continuously between the time t2 of the first braking cycle 190 and the time t1 of the next braking cycle 190. That is, the negative DC voltage (−V) is held continuously during the dead time when the braking PWM signal is absent. In this example, the substantially continuous application of this negative DC voltage (−V) during the dead time reduces or entirely eliminates any remanent magnetic field in the magnetic brake apparatus 160.

In the presently disclosed magnetic brake apparatus 160, about 100 percent of the surface area of the brake disc 172 is in contact with the face of the pot magnet 166 and electromagnetic coil 168, thereby maximizing the braking force to the brake disc 172. This is compared with only about 20 percent of the brake disc surface area used in conventional mechanical and/or hydraulic brake systems. As a result, in magnetic brake apparatus 160 a small amount of power (e.g., via +V) can be applied between the time t1 and the time t2 of the braking cycle 190 and still achieve maximum braking force.

In another example and referring now to the waveform 196*b* shown in FIG. 5, the full-bridge driver 144 provides the positive DC voltage (+V) between the time t1 and the time t2 when the braking PWM signal is present at FWD and TRIG is inactive (e.g., a logic zero) at REV. Then and still referring to the waveform 196*b*, at the time t2 when the braking PWM signal ends and TRIG switches to active (e.g., switches to a logic one), the output of the full-bridge driver 144 pulses slightly negative DC voltage (−V) for some period of time. Namely, there is a negative DC voltage (−V) pulse from the time t2 to the time t3. Then at the time t3 the signal returns to ground (i.e., to about 0 VDC). The signal is held at ground from the time t3 of the first braking cycle 190 to the time t1 of the next braking cycle 190. In this example, the application of this negative DC voltage (−V) pulse following the end of the PWM signal reduces or entirely eliminates any remanent magnetic field in the magnetic brake apparatus 160. The minimum pulse width of this negative DC voltage (−V) is at least the amount of time needed to remove the remanent magnetic field and can vary depending on the physical size and/or any other characteristics of the magnetic brake apparatus 160. Further, the pulse width may vary depending on the amplitude of the negative pulse. For example, the smaller the amplitude the longer the pulse or the greater the amplitude the shorter the pulse.

The removal of the remanent magnetic field in portion p2 of the braking cycle 190 ensures that the brake disc 172 rapidly and fully disengages from the face of the pot magnet 166 and the electromagnetic coil 168 and ensures that no drag occurs when ending the braking cycle.

In yet another example and referring now to the waveform 196*c* shown in FIG. 5, the full-bridge driver 144 provides the positive DC voltage (+V) between the time t1 and the time t2 when the braking PWM signal is present at FWD and TRIG is inactive (e.g., a logic zero) at REV. Then and still referring to the waveform 196*c*, at the time t2 when the braking PWM signal ends and TRIG switches to active (e.g., switches to a logic one), the output of the full-bridge driver 144 switches from the positive DC voltage (+V) to ground (i.e., to about 0 VDC). Absent the negative DC voltage (−V) or pulse shown in the waveforms 196*a*, 196*b* some remanent magnetic field may remain in the magnetic brake apparatus 160, yet the magnetic brake apparatus 160 may still provide suitable braking function; albeit with somewhat less response and control than when the negative DC voltage (−V) or pulse is used.

Figure 6:
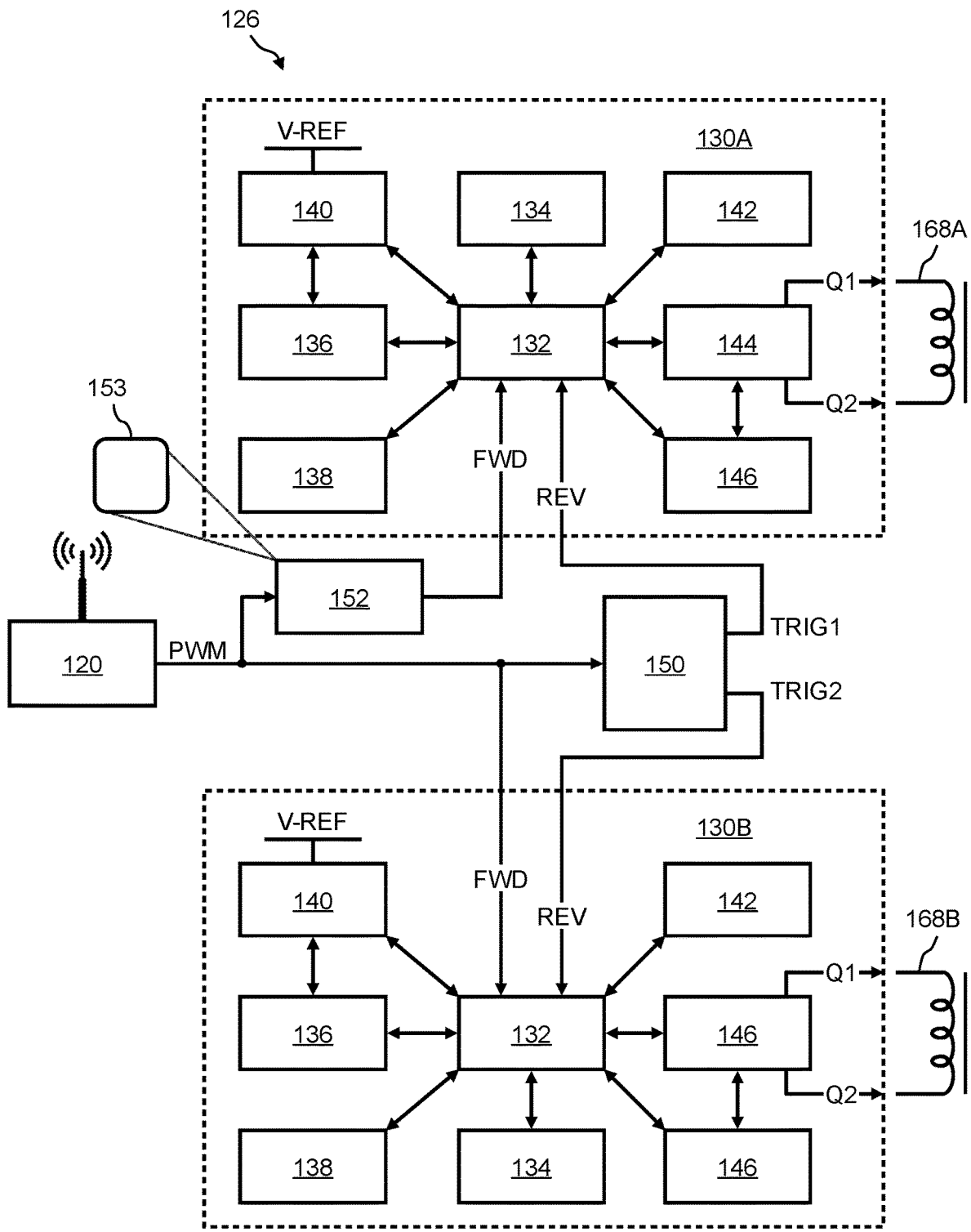
FIG. 6 is an illustration of an exemplary one-channel control electronics for controlling two magnetic brake apparatuses, in accordance with an embodiment of the present invention.
Figure 9:
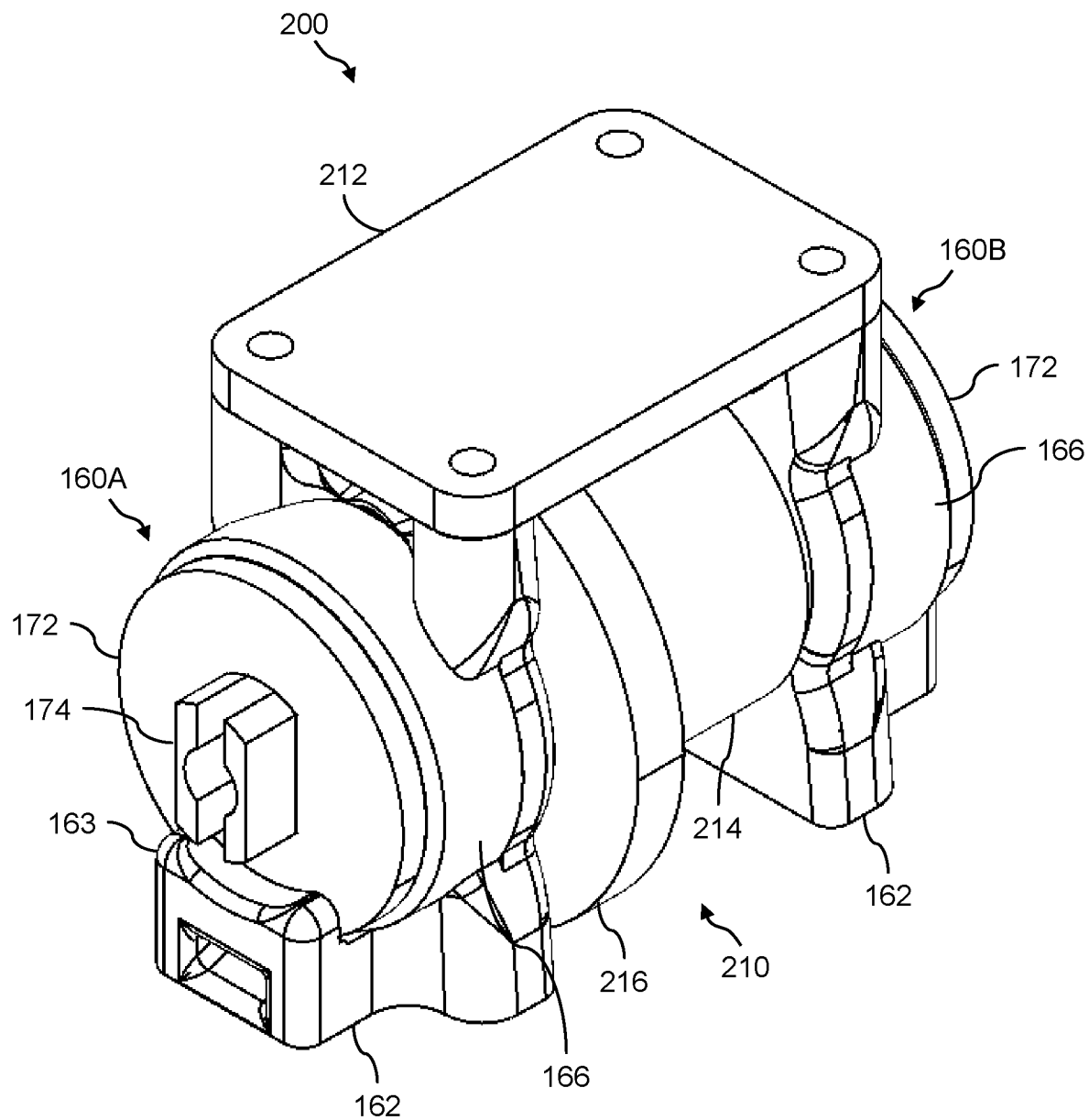
FIG. 9, FIG. 10, FIG. 11, FIG. 12, FIG. 13, and FIG. 14 illustrates an exemplary perspective view, side view, first end view, second end view, top view, and bottom view, respectively, of an example of a differential assembly that includes two, instances of a magnetic brake apparatus, in accordance with an embodiment of the present invention.
Figure 10:
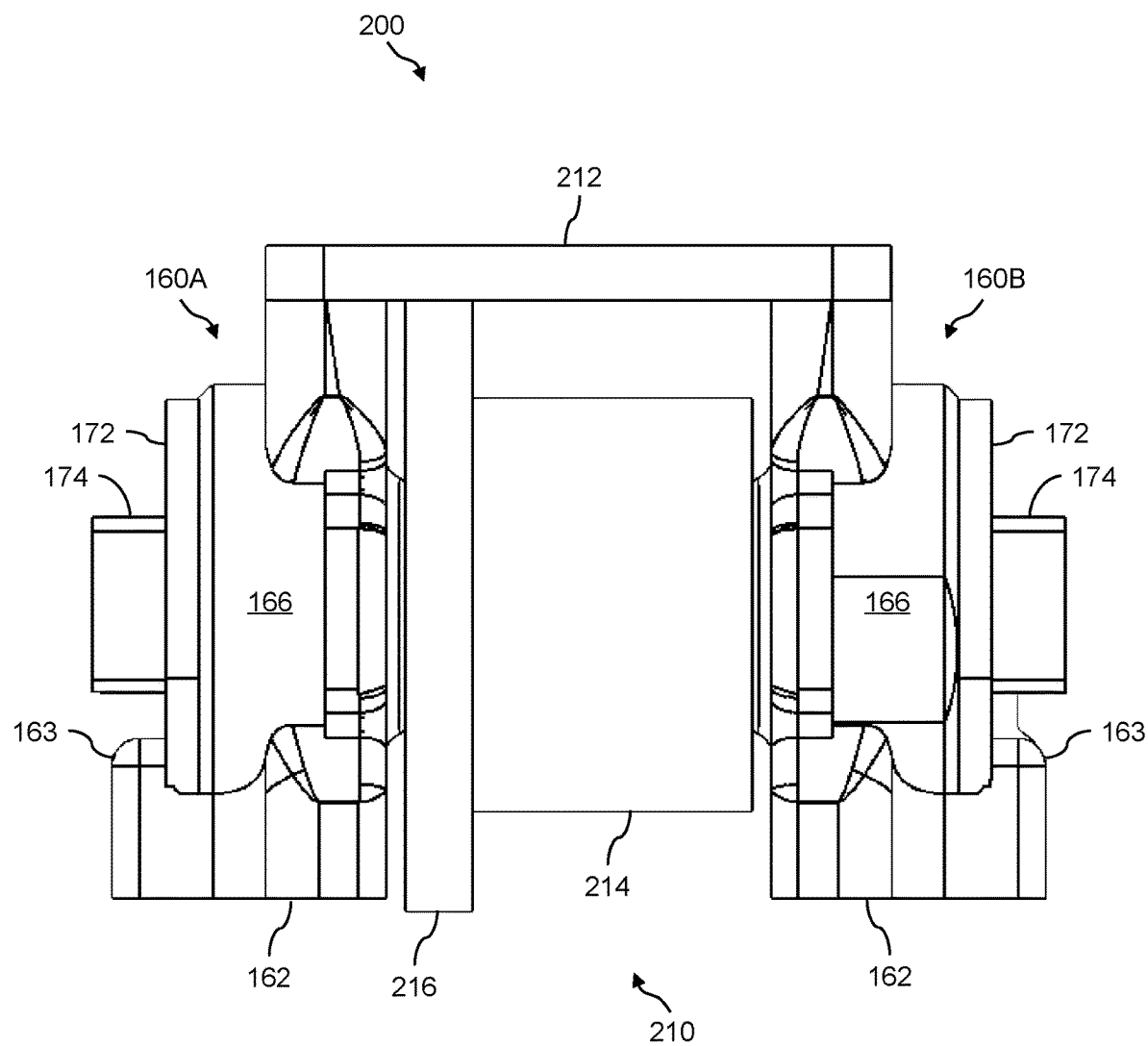
Figure 11:
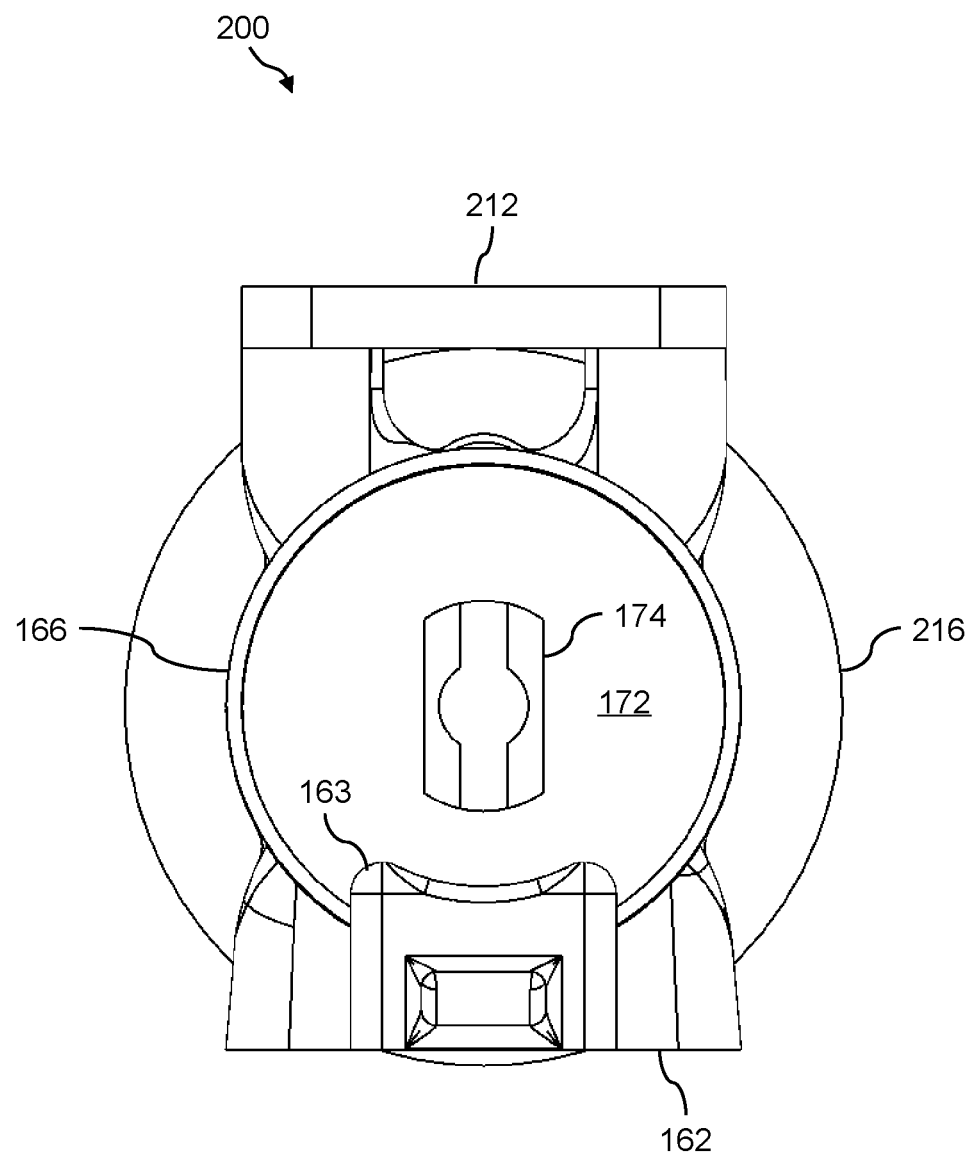
Figure 12:
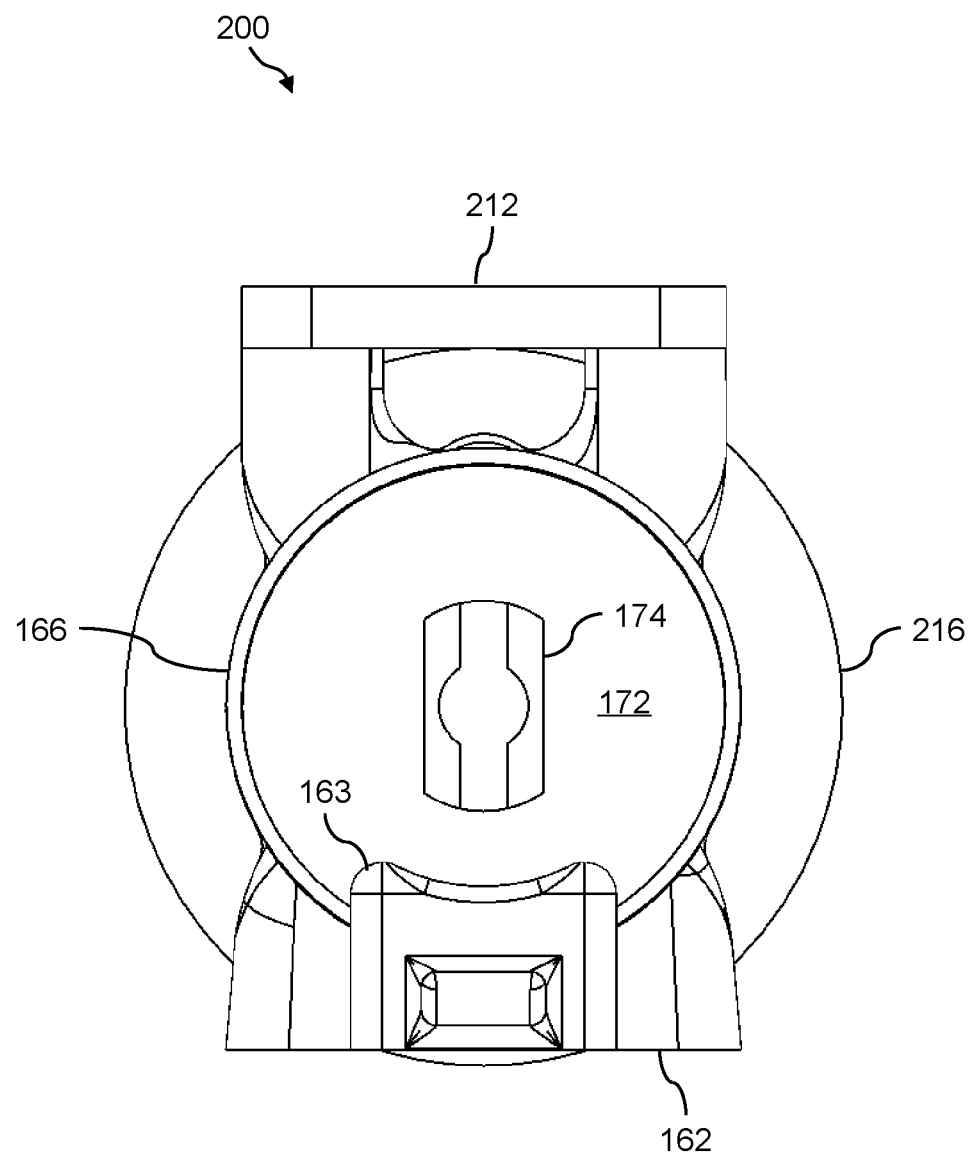
Figure 13:
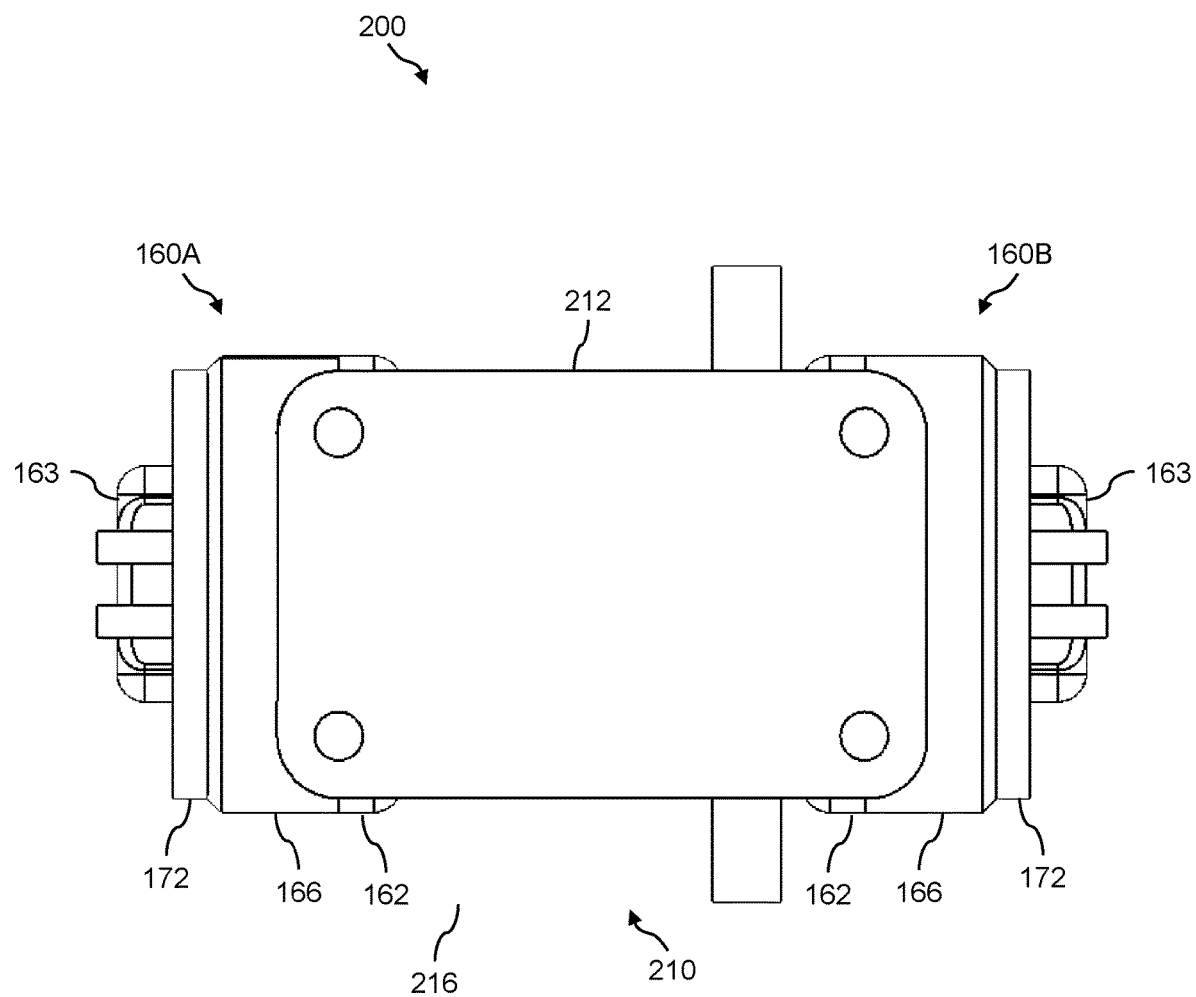
Figure 14:
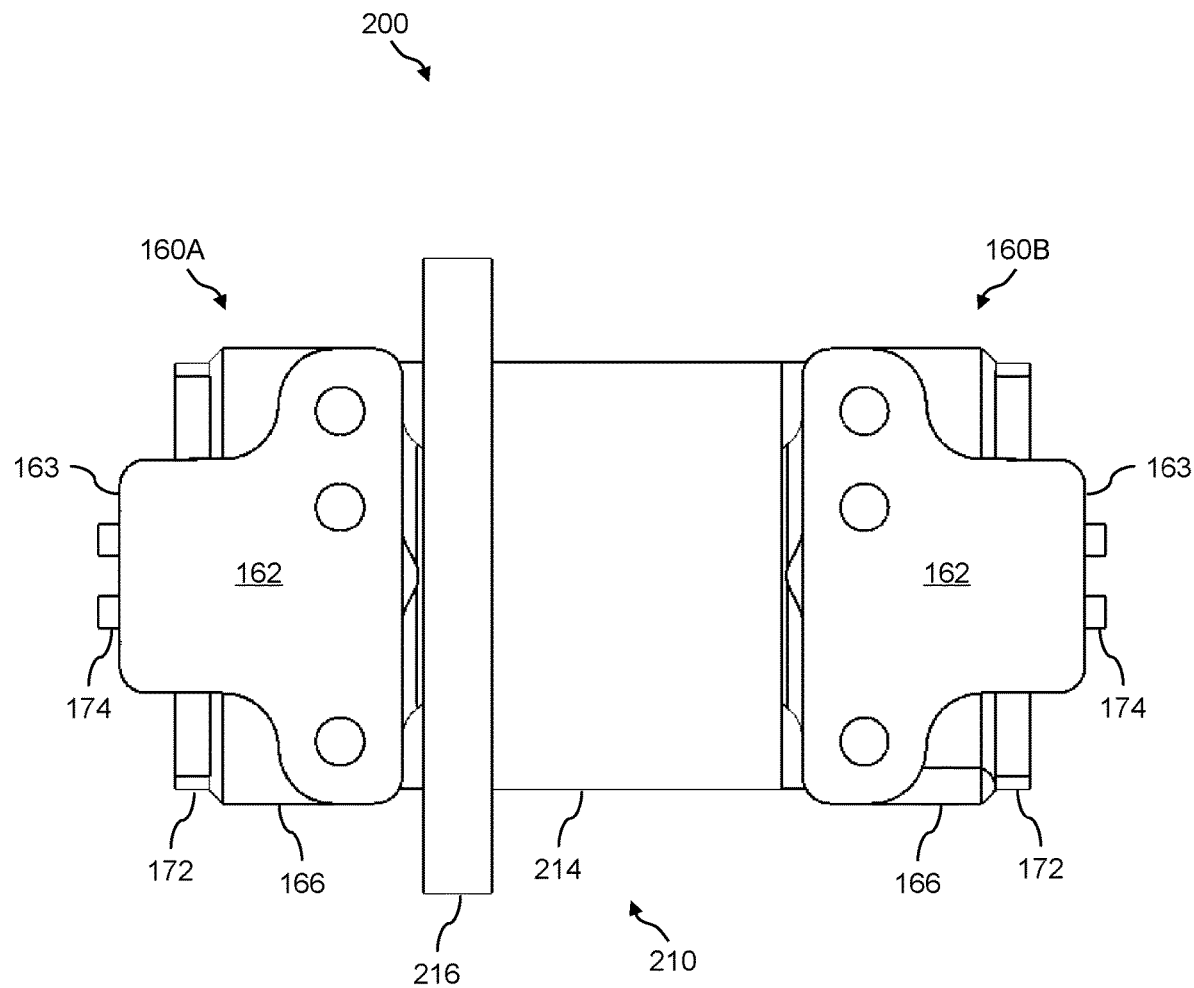

FIG. 6 is an illustration of an exemplary one-channel control electronics for controlling two magnetic brake apparatuses, in accordance with an embodiment of the present invention. In the present embodiment shown, a one-channel control electronics 126 supports a magnetic brake apparatus 160A (see. FIG. 9) and a magnetic brake apparatus 160B (see FIG. 9). The magnetic brake apparatus 160A can be, for example, the front brake while the magnetic brake apparatus 160B can be, for example, the rear brake of the magnetically-braked RC model vehicle 100. In this example, two magnetic brake apparatuses 160 are controlled in common via one PWM control channel.

The one-channel control electronics 126 includes a brake control module 130A for controlling the magnetic brake apparatus 160A and a brake control module 130B for controlling the magnetic brake apparatus 160B, wherein both brake control modules 130A and 130B are controlled using a one channel only from the receiver 120. Each of the brake control modules 130A and 130B operates as described hereinabove with reference to FIG. 4 and FIG. 5. In this example, the reverse polarity trigger 150 has two trigger outputs; namely, a TRIG1 that supplies the REV input of the controller 132 of the brake control module 130A and a TRIG2 that supplies the REV input of the controller 132 of the brake control module 130B.

Additionally, one-channel control electronics 126 includes brake bias control. Brake bias refers to the relative amount of braking force applied at the front vs the rear of the vehicle. Adjusting brake bias effects how the vehicle reacts and handles during braking. A vehicle with ideal brake bias will generally brake in a consistent manner. More particularly, the brake bias of an RC model vehicle can be set for (1) more front braking force, (2) more rear braking force, or (3) substantially equal front and rear braking force (aka even brake bias) (e.g., lock all 4 wheels at the same time). For example, more front bias may provide better straight-line braking while more rear bias may provide better cornering to avoid spinning out.

Accordingly, the one-channel control electronics 126 includes certain brake bias control 152 for digitally and/or electronically controlling and/or adjusting the brake bias, such as 0-99% front to rear voltage strength bias. Further, the brake bias control 152 may have digital readout (e.g., a display 153) and pushbutton controls (not shown) that allow the user to easily and precisely set the brake bias. For example, the rear brake bias (e.g., 70%) can be displayed at the display 153. Other information can be shown via the display 153, such as various modes including anti-lock braking modes or any other information programmed into the magnetic brake control electronics 125. In the one-channel control electronics 126, the one braking PWM signal from the receiver 120 supplies the reverse polarity trigger 150, the FWD input of the controller 132 of the brake control module 130B, and an input of the brake bias control 152. Then, an output of the brake bias control 152 supplies the FWD input of the controller 132 of the brake control module 130A. Accordingly, the one braking PWM signal from the receiver 120 can be used to control both the brake control module 130A (e.g., the front brake) and the brake control module 130B (e.g., the rear brake) while still providing brake bias control.

Referring still to FIG. 6, in each of the brake control modules 130A and 130B, digital power control is provided to control the output (e.g., the full-bridge driver 144) of the brake control module 130 where the voltage limit is defined using the input PWM signal. Both of the magnetic brake apparatuses 160A and 160B are controlled using one input PWM signal. In this example, the magnetic brake apparatus 160B driven by the brake control module 130B will receive power proportional to the input PWM signal and the magnetic brake apparatus 160A driven by the brake control module 130A can be controlled digitally from zero up to the voltage limit defined using the input PWM signal, such as 0-99% front to rear voltage strength bias.

Figure 7:
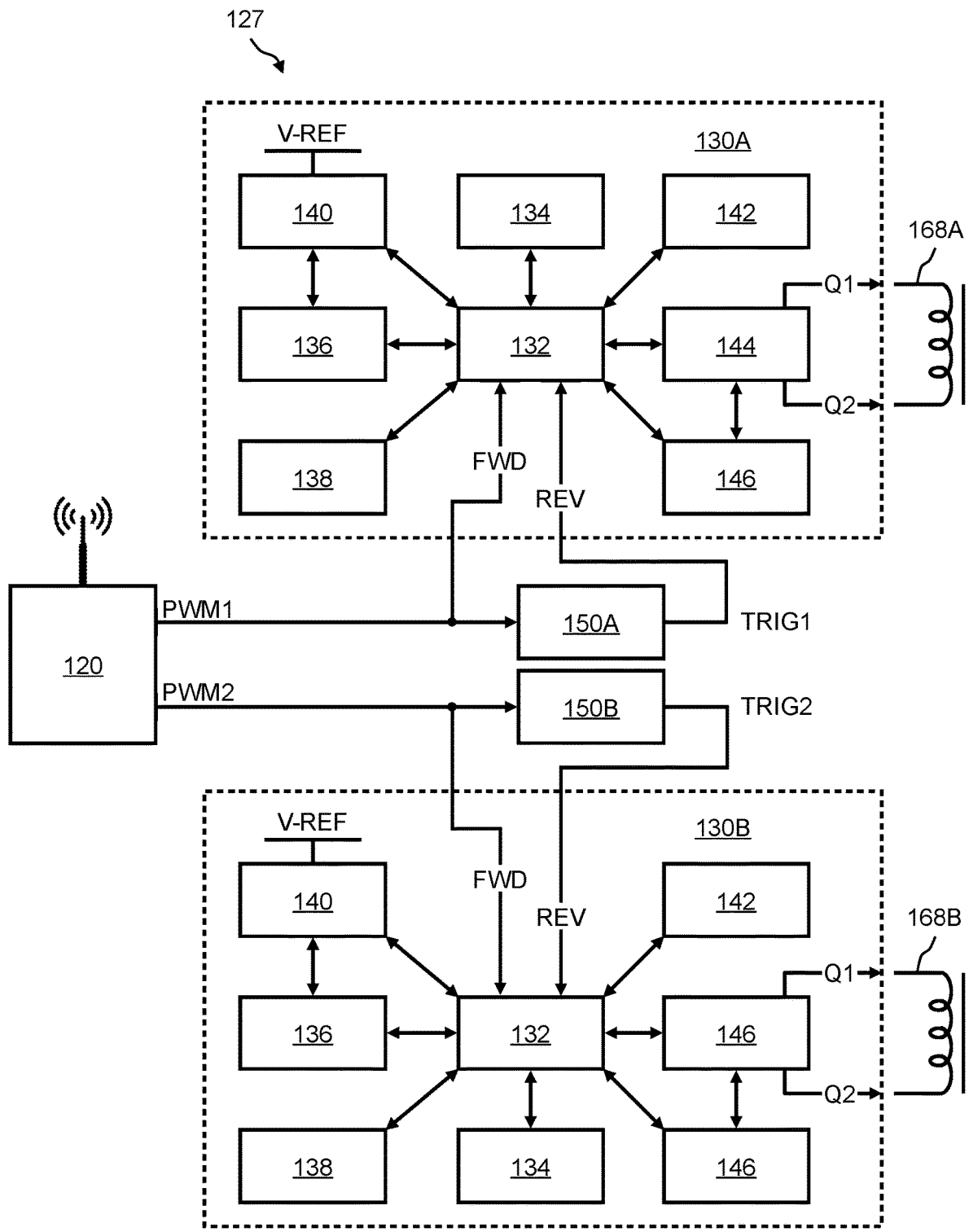
FIG. 7 is an illustration of an exemplary two-channel control electronics for controlling two magnetic brake apparatuses, in accordance with an embodiment of the present invention.

FIG. 7 is an illustration of an exemplary two-channel control electronics for controlling two magnetic brake apparatuses, in accordance with an embodiment of the present invention. In the present embodiment shown, the two-channel control electronics 127 is yet another example of the magnetic brake control electronics 125 of the magnetically-braked RC model vehicle 100 shown in FIG. 1. In this example, the two-channel control electronics 127 supports the magnetic brake apparatus 160A (see FIG. 9) and the magnetic brake apparatus 160B (see FIG. 9). The magnetic brake apparatus 160A can be, for example, the front brake while the magnetic brake apparatus 160B can be, for example, the rear brake of the magnetically-braked RC model vehicle 100. In this example, two magnetic brake apparatuses 160 are controlled separately and independently via the two separate PWM control channels.

The two-channel control electronics 127 includes the brake control module 130A for controlling the magnetic brake apparatus 160A and the brake control module 130B for controlling the magnetic brake apparatus 160B. In this example, the brake control module 130A and accordingly the magnetic brake apparatus 160A is controlled using a first channel from the receiver 120; namely, a braking PWM1 signal. Further, the brake control module 130B and accordingly the magnetic brake apparatus 160B is controlled using a second channel from the receiver 120; namely, a braking PWM2 signal.

Further, the two-channel control electronics 127 includes a reverse polarity trigger 150A that is dedicated to the brake control module 130A only and a reverse polarity trigger 150B that is dedicated to the brake control module 130B only. For example, the braking PWM1 signal supplies the FWD input of the controller 132 of the brake control module 130A and also supplies the input to the reverse polarity trigger 150A. Then, the TRIG1 output of the reverse polarity trigger 150A supplies the REV input of the controller 132 of the brake control module 130A. Similarly, the braking PWM2 signal supplies the FWD input of the controller 132 of the brake control module 130B and also supplies the input to the reverse polarity trigger 150B. Then, the TRIG2 output of the reverse polarity trigger 150B supplies the REV input of the controller 132 of the brake control module 130B. Again, each of the brake control modules 130A and 130B operates as described hereinabove with reference to FIG. 4 and FIG. 5. However, because the brake control modules 130A and 130B are controlled by their respective and separate PWM signals, there is no need to incorporate the brake bias control 152 of the one-channel control electronics 126 shown in FIG. 6.

In each of the brake control modules 130A and 130B, digital power control is provided to control the output (e.g., the full-bridge driver 144) of the brake control module 130 where the voltage limit is defined using the input PWM signal. The magnetic brake apparatuses 160A and 160B are controlled using the input PWM1 signal and the input PWM2 signal, respectively. In this example, the magnetic brake apparatus 160A driven by the brake control module 130A will receive power proportional to the input PWM1 signal. Likewise, the magnetic brake apparatus 160B driven by the brake control module 130B will receive power proportional to the input PWM2 signal.

Figure 8A:
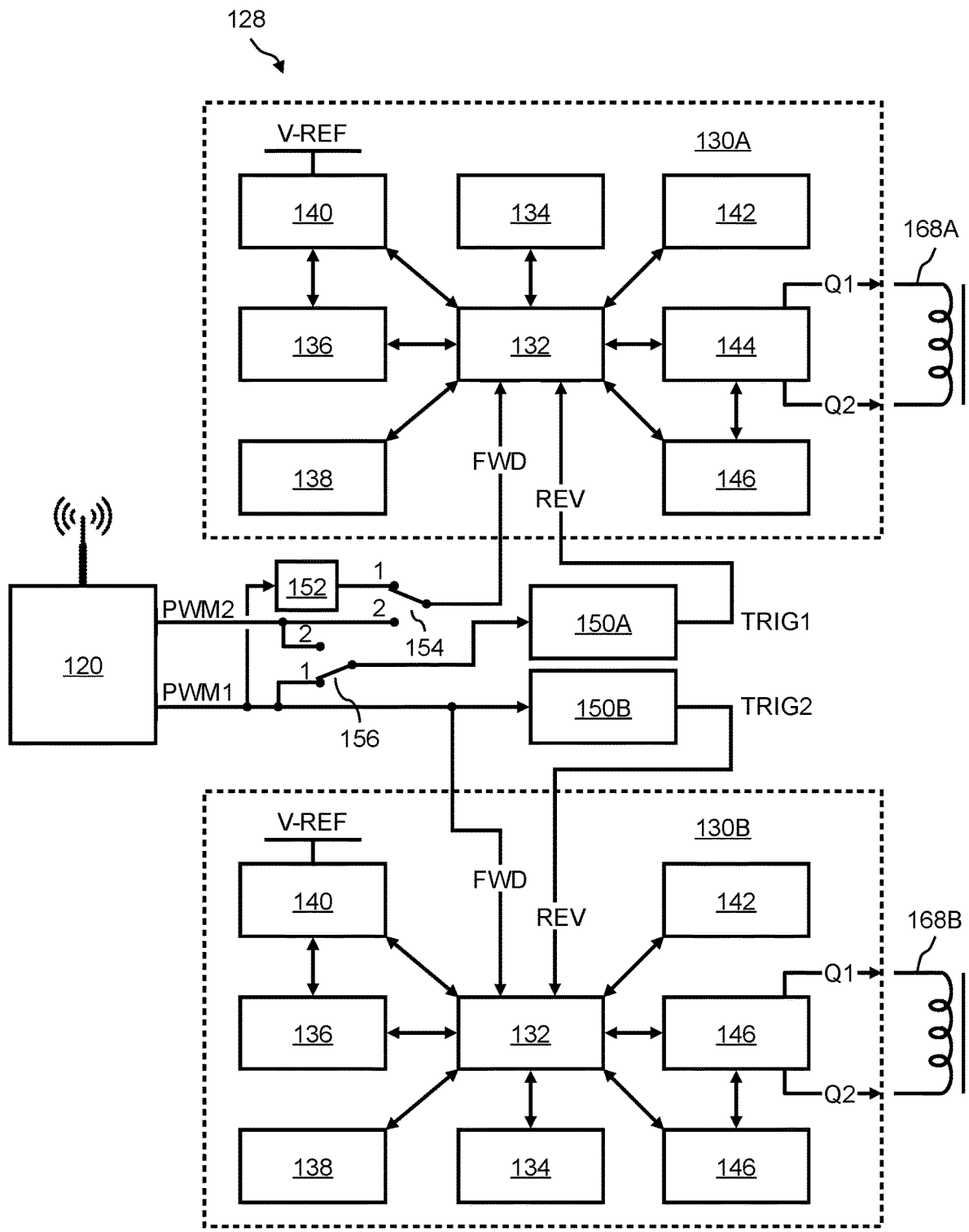
FIG. 8A and FIG. 8B illustrates an exemplary one/two-channel control electronics for controlling two magnetic brake apparatuses, in accordance with an embodiment of the present invention.
Figure 8B:
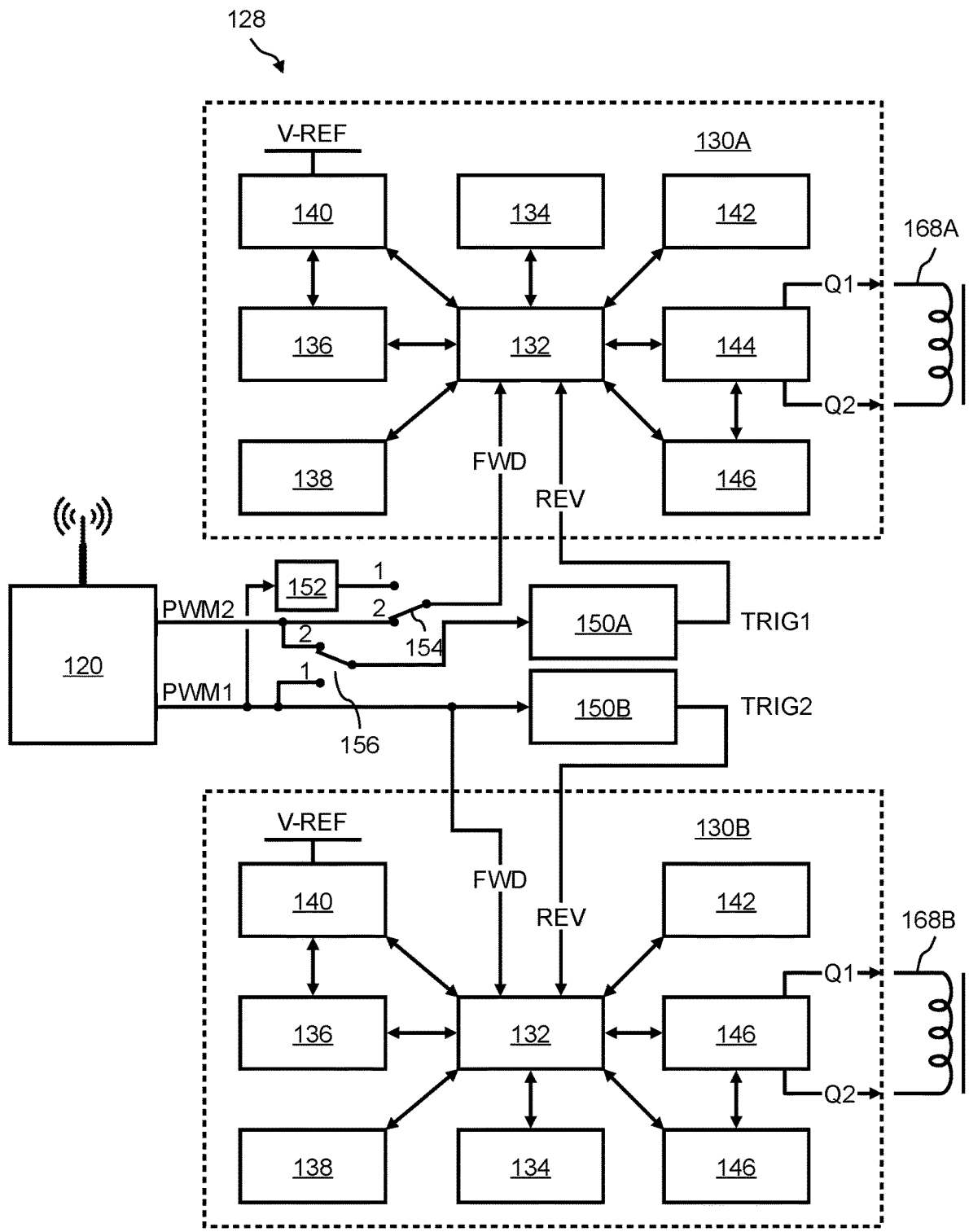

FIG. 8A and FIG. 8B illustrates an exemplary one/two-channel control electronics 128 for controlling two magnetic brake apparatuses 160, in accordance with an embodiment of the present invention. Namely, the one/two-channel control electronics 128 is still another example of the magnetic brake control electronics 125 of the magnetically-braked RC model vehicle 100 shown in FIG. 1. In this example, the one/two-channel control electronics 128 supports the magnetic brake apparatus 160A (see FIG. 9) and the magnetic brake apparatus 160B (see FIG. 9). The magnetic brake apparatus 160A can be, for example, the front brake while the magnetic brake apparatus 160B can be, for example, the rear brake of the magnetically-braked RC model vehicle 100.

In this example, the one/two-channel control electronics 128 is selectable to operate the two magnetic brake apparatuses 160 either in "one-channel mode" or in "two-channel mode." For example, in "one-channel mode," the two magnetic brake apparatuses 160 are controlled in common via, one PWM control channel as described hereinabove with reference to the one-channel control electronics 126 shown in FIG. 6. Additionally, in "two-channel mode," the two magnetic brake apparatuses 160 are controlled separately and independently via two separate PWM control channels as described hereinabove with reference to the two-channel control electronics 127 shown in FIG. 7.

The operating modes of the one/two-channel control electronics 128 are selectable via a pair of switches. Namely, one/two-channel control electronics 128 is substantially the same as two-channel control electronics 127 shown in FIG. 7 except for the addition of two switches (e.g., a switch 154 and a switch 156) and the inclusion of the brake bias control 152. The switch 154 is in the path that supplies the FWD input of the controller 132 of the brake control module 130A. The switch 156 is in the path that supplies the input of the reverse polarity trigger 150A.

Both switch 154 and switch 156 have a position 1 and a position 2. When both the switch 154 and the switch 156 are in position 1 as shown in FIG. 8A, one/two-channel control electronics 128 operates in "one-channel mode" (using input PWM1 only) and wherein the brake bias control 152 is in play. By contrast, when both the switch 154 and the switch 156 are in position 2 as shown in FIG. 8B, one/two-channel control electronics 128 operates in "two-channel mode" (using both input PWM1 and PWM2) and the brake bias control 152 is bypassed.

Referring now again to FIG. 1 through FIG. 8B, the magnetic brake control electronics 125 is not limited to the number of input PWM channels, number of the brake control modules 130, and/or the number of the magnetic brake apparatuses 160 described hereinabove. The magnetic brake control electronics 125 can be modified to support any number of input PWM channels and/or any number of the magnetic brake apparatuses 160. Further, in other embodiments, the one or more brake control modules 130 can be built into the receiver 120, rather than separate. Additionally, the magnetic brake control electronics 125 and/or the magnetic brake apparatus 160 can include any other instrumentation 158 (see FIG. 4) that is useful in the magnetically-braked RC model vehicle 100. In one example, the other instrumentation 158 can include a temperature sensor at the magnetic brake apparatus 160, wherein the brake control module 130 monitors the temperature sensor and adjusts the power to the electromagnet if it becomes too hot. In another example, the other instrumentation 158 can include a hall effect sensor at the magnetic brake apparatus 160 so that so that the controller 132 can monitor the amount of magnetism that is created by the output of the voltage applied. Additionally, rather than installing the Hall Effect sensor at the magnetic brake apparatus 160, the Hall Effect sensor can be included in the brake control module 130.

In other embodiments, the radio transmitter 110 may be capable of processing information, such as sensor data, from the magnetic brake control electronics 125 in order to control certain functions and/or features of the magnetically-braked RC model vehicle 100. For example, the radio transmitter 110 may be able to control the negative DC voltage (−V) or pulse driving each of the magnetic brake apparatuses 160, may be able to process and respond to any sensor data, such as from temperature sensors and hall effect sensors, and the like.

FIG. 9, FIG. 10, FIG. 11, FIG. 12, FIG. 13, and FIG. 14 illustrates an exemplary perspective view, side view, first end view, second end view, top view, and bottom view, respectively, of an example of a differential assembly that includes two instances of a magnetic brake apparatus, in accordance with an embodiment of the present invention. The differential assembly 200 includes a differential portion 210 that is arranged between the magnetic brake apparatus 160A and the magnetic brake apparatus 160B. In one example, the differential assembly 200 can be a center differential system and the magnetic brake apparatus 160A is the front brake while the magnetic brake apparatus 160B is the rear brake. In another example, the differential assembly 200 can be a front or rear differential system and the magnetic brake apparatus 160A is the right (or left) brake while the magnetic brake apparatus 160B is the left (or right) brake.

Each of the magnetic brake apparatuses 160A and 160B of the differential assembly 200 include the bulkhead housing 162, the bearing 164, the pot magnet 166 (i.e., a pot-shaped magnet) arranged with respect to the electromagnetic coil 168, the friction disc (or pad) 170, the brake disc 172, the outdrive coupler 174. Further, the differential portion 210 of the differential assembly 200 includes a support or mounting plate 212, a differential mechanism 214, and a spur gear 216.

Figure 15:
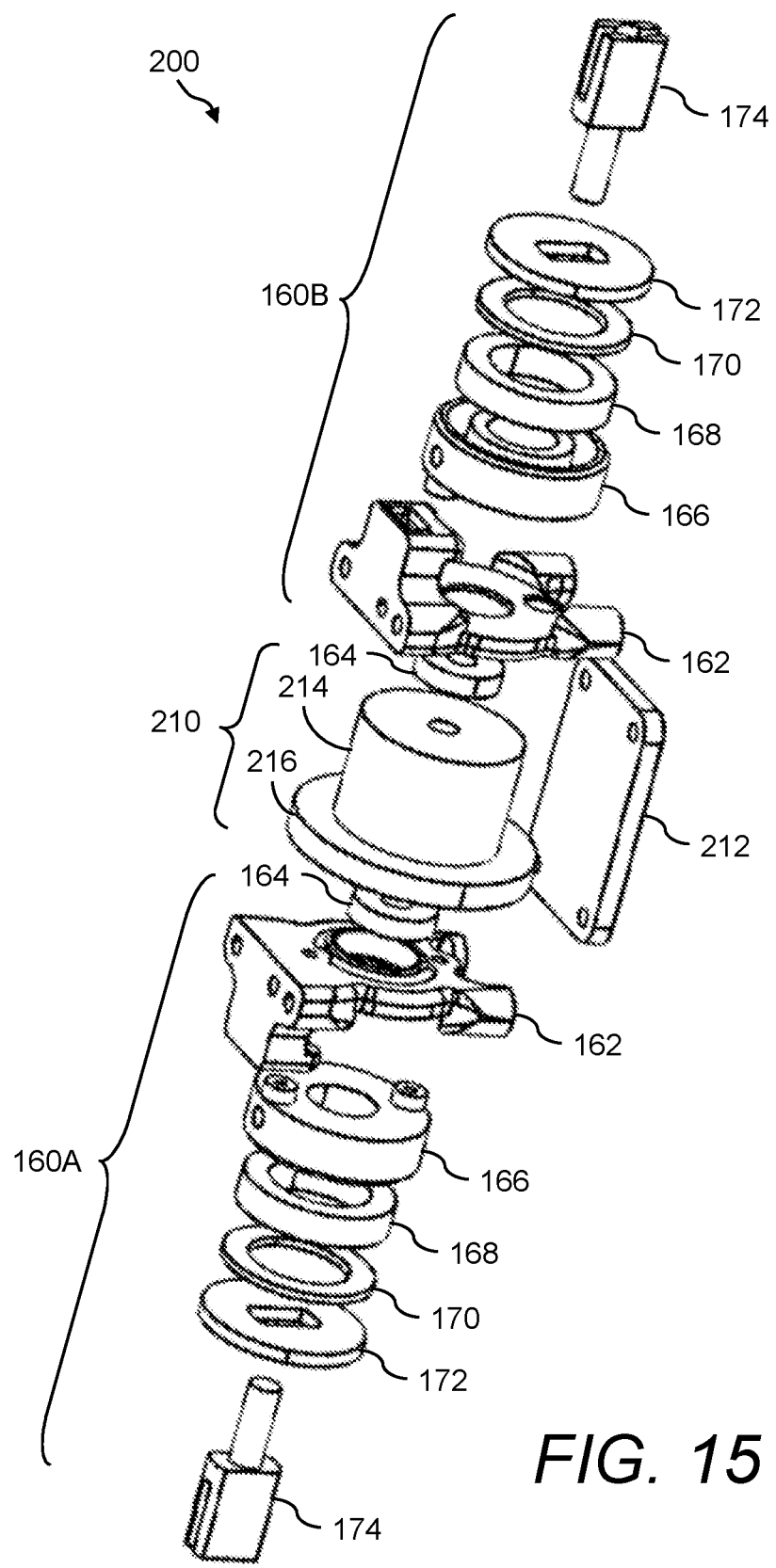
FIG. 15 and FIG. 16 illustrate exploded views of a differential assembly that includes two instances of a magnetic brake apparatus, in accordance with an embodiment of the present invention.
Figure 16:
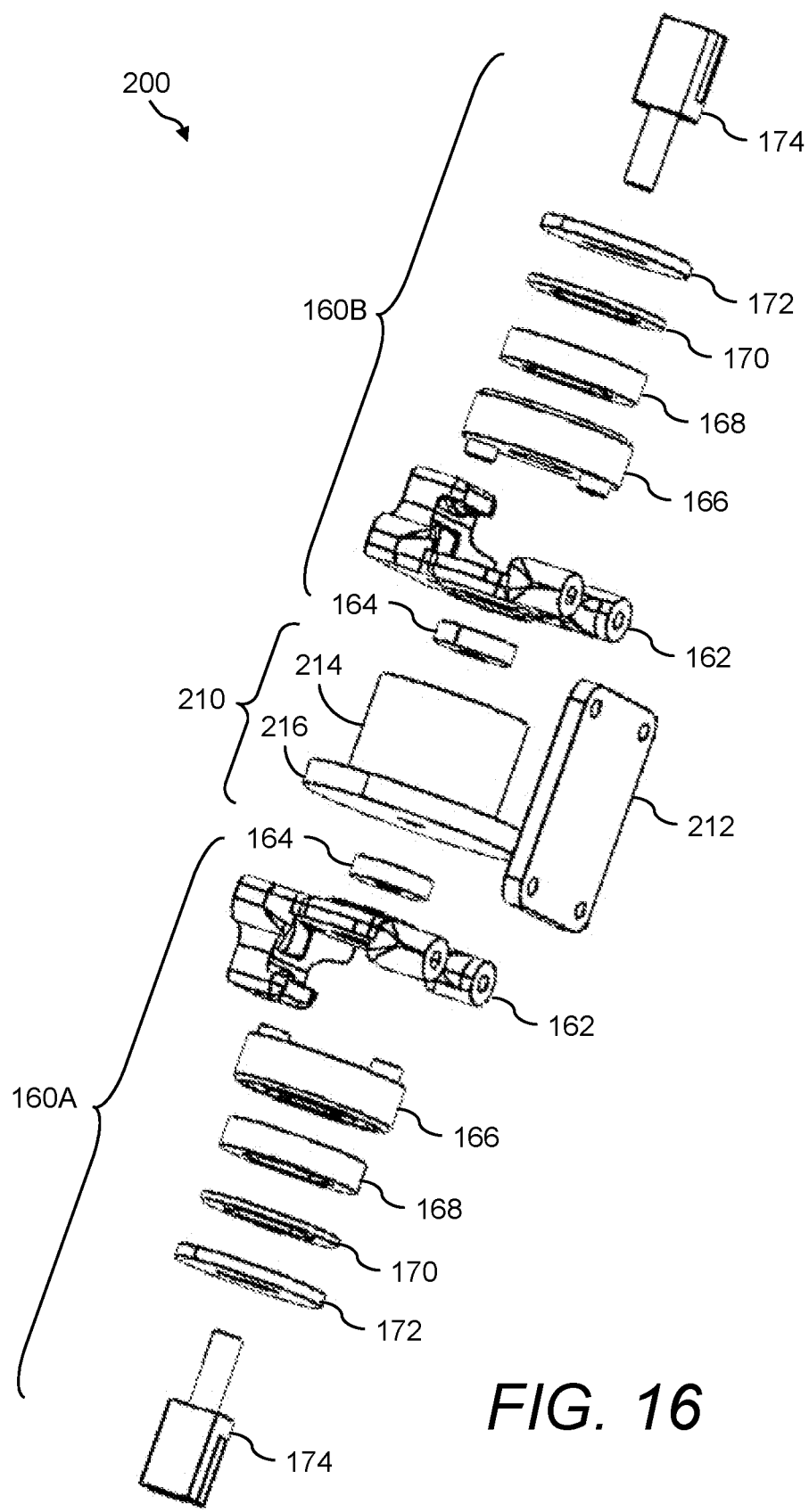

FIG. 15 and FIG. 16 illustrate exploded views of an exemplary differential assembly that includes two instances of a magnetic brake apparatus, in accordance with an embodiment of the present invention. The differential assembly is shown in FIG. 9 through FIG. 14 that includes two instances of the magnetic brake apparatus 160 shown in FIG. 2 and FIG. 3.

Figure 17:
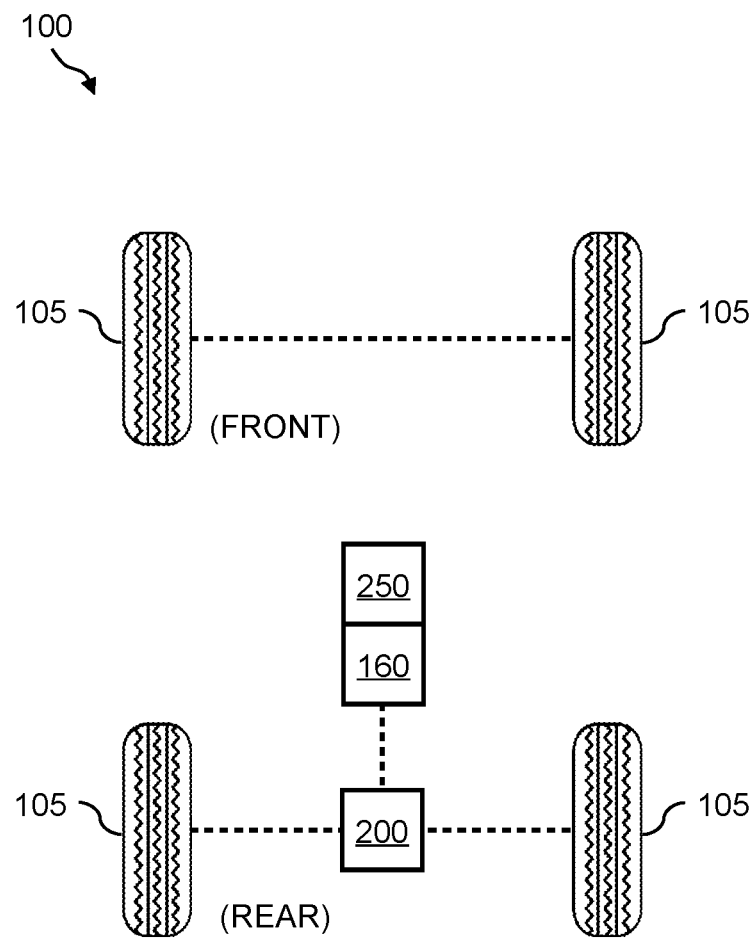
FIG. 17 through FIG. 22 show plan views of different configurations of one or more magnetic brake apparatuses, in accordance with an embodiment of the present invention.

FIG. 17 through FIG. 22 show plan views of different exemplary configurations of one or more magnetic brake apparatuses, in accordance with an embodiment of the present invention. In any configurations, the magnetic brake apparatus(es) 160 can be utilized with driven wheels and/or non-driven wheels. For example, FIG. 17 shows a RWD configuration of the magnetically-braked RC model vehicle 100. This configuration includes an engine (or motor) 250 coupled with one magnetic brake apparatus 160 and driving the rear wheels through the differential assembly 200. This configuration shows the magnetic brake apparatus 160 for rear braking.

Figure 18:
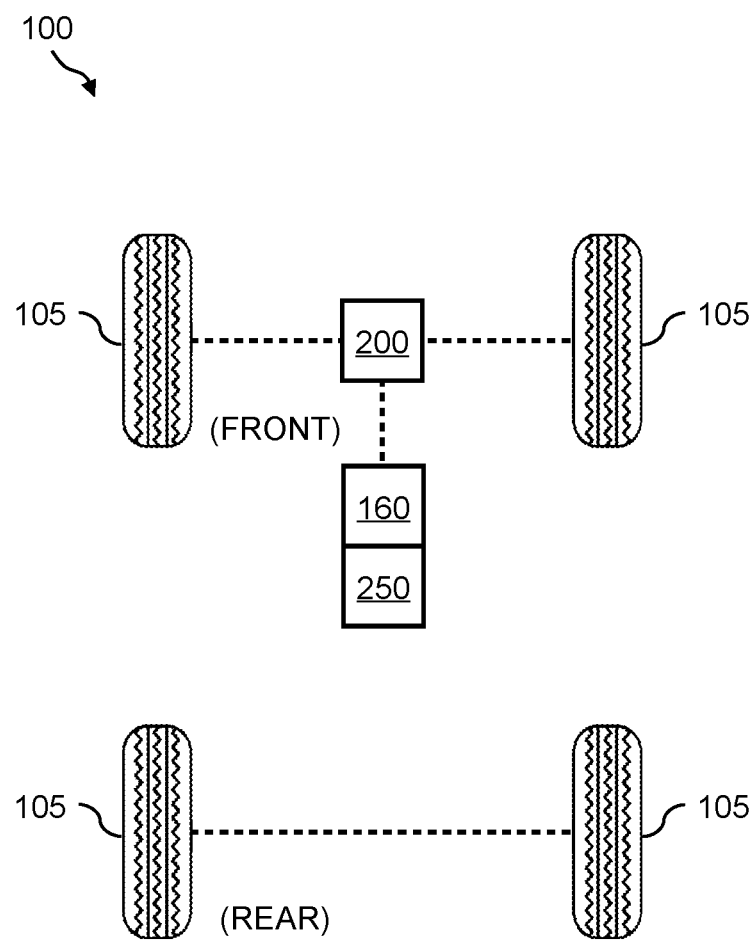

FIG. 18 shows a FWD configuration of the magnetically-braked RC model vehicle 100. This configuration includes the engine (or motor) 250 coupled with one magnetic brake apparatus 160 and driving the front wheels through the differential assembly 200. This configuration shows the magnetic brake apparatus 160 for front braking.

Figure 19:
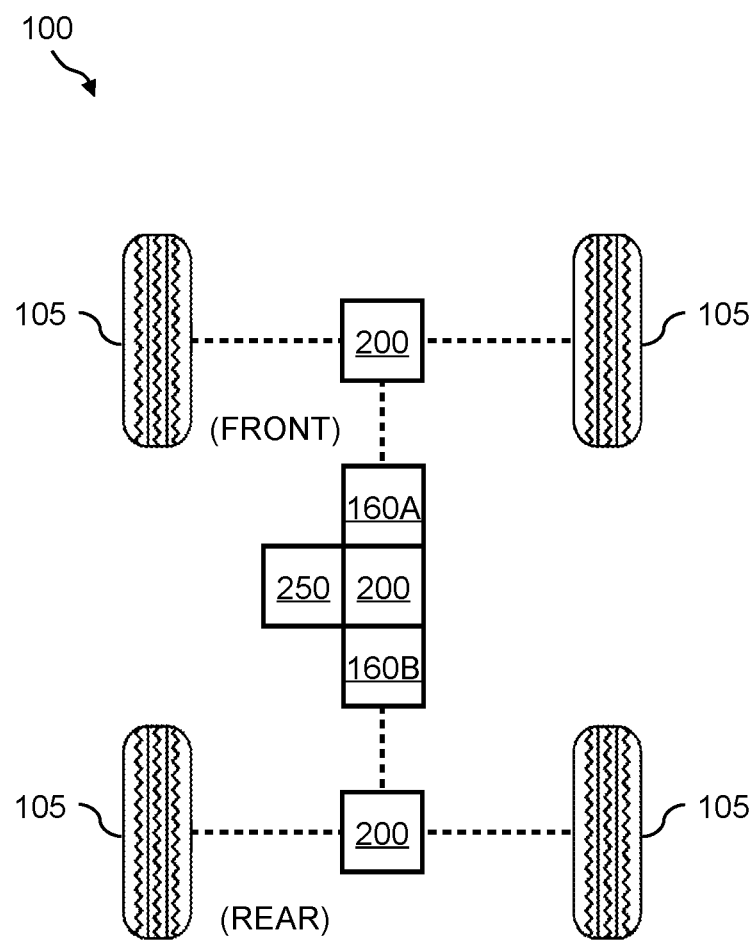

FIG. 19 shows an AWD or 4WD configuration of the magnetically-braked RC model vehicle 100. This configuration includes the magnetic brake apparatuses 160A and 160B with a center differential assembly 200 and driven by the engine (or motor) 250. This configuration shows the magnetic brake apparatuses 160A and 160B providing both front and rear braking, respectively.

Figure 20:
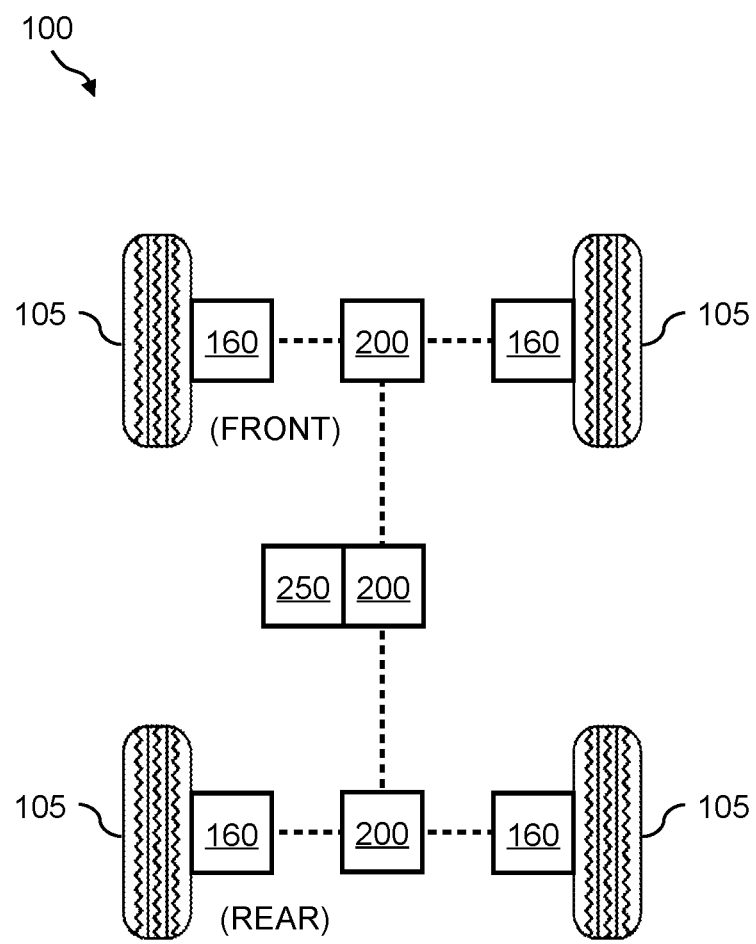

FIG. 20 shows another AWD or 4WD configuration of the magnetically-braked RC model vehicle 100. This configuration includes a magnetic brake apparatus 160 installed at each wheel 105 for a total of four magnetic brake apparatuses 160 and wherein the magnetic brake apparatuses 160 are separate from any other assembles. This AWD or 4WD configuration provides independent all wheel braking.

Figure 21:
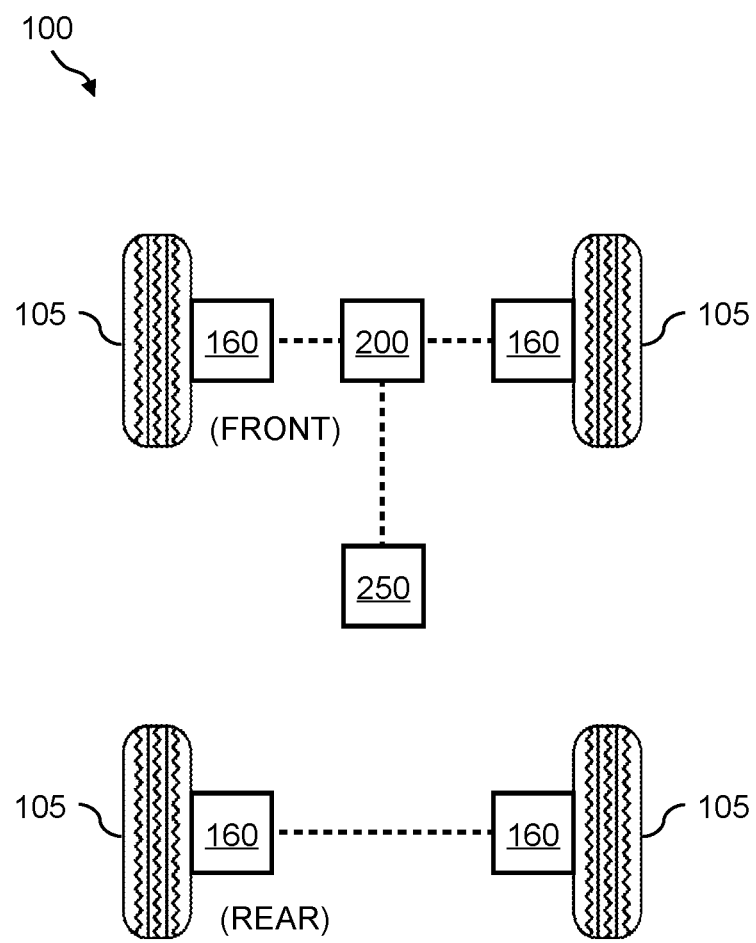

FIG. 21 shows another FWD configuration of the magnetically-braked RC model vehicle 100. This configuration includes a magnetic brake apparatus 160 installed at each wheel 105 for a total of four magnetic brake apparatuses 160. However, this vehicle is, for example, a FWD vehicle rather than a 4WD vehicle. Again, in this example, the four magnetic brake apparatuses 160 are separate from any other assembles. This FWD configuration provides independent all wheel braking. In similar fashion, a RWD configuration can be provided.

Figure 22:
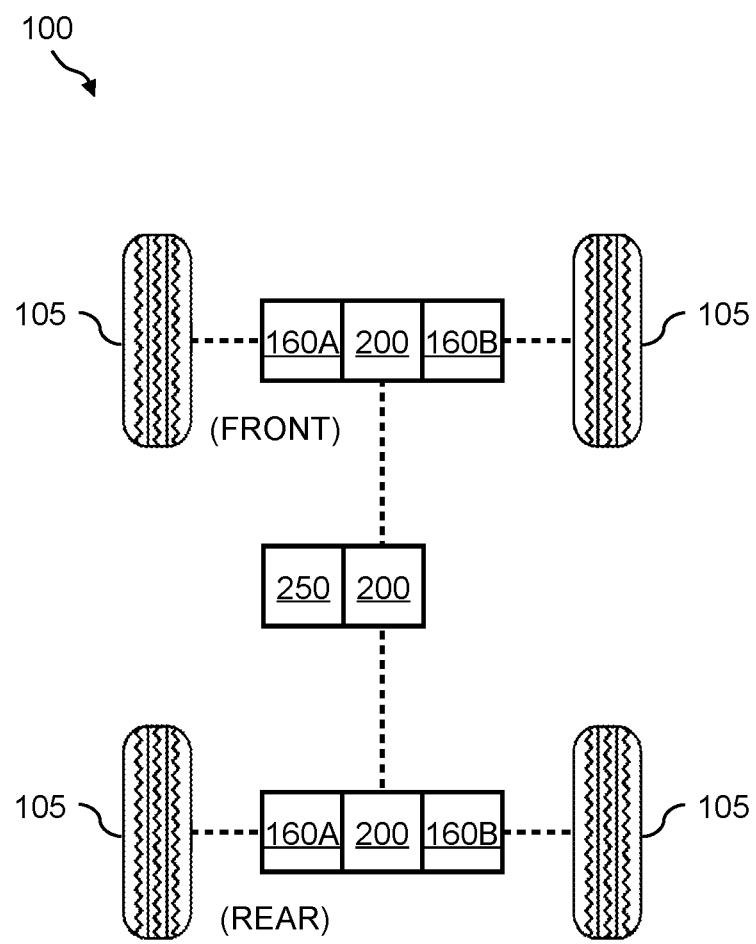

FIG. 22 shows another AWD or 4WD configuration of the magnetically-braked RC model vehicle 100. This configuration includes the magnetic brake apparatuses 160A and 160B with a front differential assembly 200 along with the magnetic brake apparatuses 160A and 160B with a rear differential assembly 200. This AWD or 4WD configuration provides independent all wheel braking.

In the configurations of the one or more magnetic brake apparatuses 160 shown in FIG. 17 through FIG. 22, the magnetic brake control electronics 125 of the magnetically-braked RC model vehicle 100 can be tailored to include any number of the brake control modules 130 to support any number of respective magnetic brake apparatuses 160. Further, the configurations of one or more magnetic brake apparatuses 160 are not limited to those shown in FIG. 17 through FIG. 22. The presently disclosed magnetically-braked RC model vehicle 100 can include any configurations of one or more magnetic brake apparatuses 160 at individual wheels and/or in any combinations integrated with any other types of assemblies, such as, but not limited to, differential assemblies, gearbox assemblies, transmission assemblies, motor assemblies, and the like.

Figure 23:
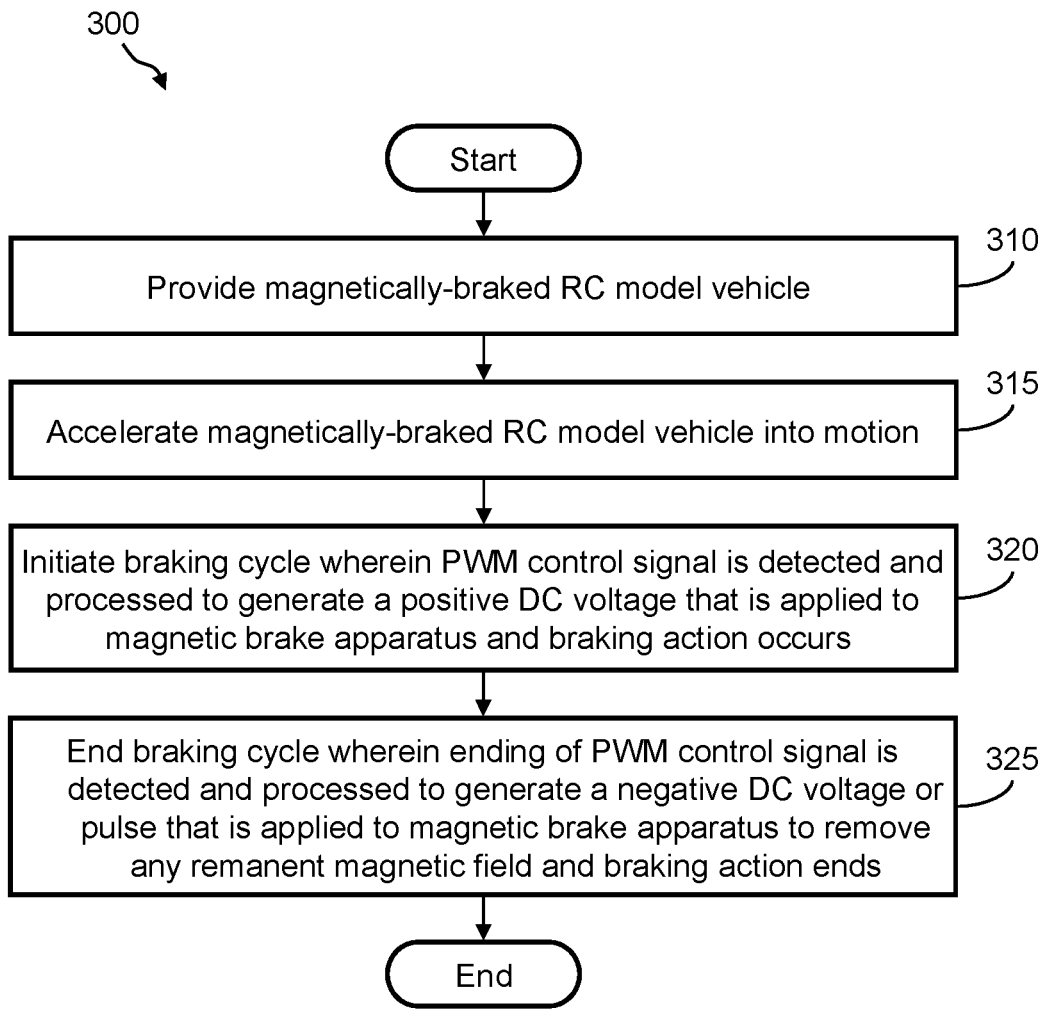
FIG. 23 illustrates a flow diagram of an exemplary method of using a magnetically-braked RC model vehicle that includes at least one magnetic brake apparatus, in accordance with an embodiment of the present invention.

FIG. 23 illustrates a flow diagram of an exemplary method 300 of using a magnetically-braked RC model vehicle that includes at least one magnetic brake apparatus, in accordance with an embodiment of the present invention. The method 300 may include, but is not limited to, the following steps.

At step 310, a magnetically-braked RC model vehicle is provided. For example, the presently disclosed magnetically-braked RC model vehicle 100 is provided, wherein the magnetically-braked RC model vehicle 100 is an RC model vehicle that includes at least one magnetic brake apparatus 160 and corresponding magnetic brake control electronics 125.

At step 315, the magnetically-braked RC model vehicle is accelerated into motion. For example, using the radio transmitter 110 to control the engine speed, the magnetically-braked RC model vehicle 100 is accelerated into motion.

At step 320, the braking cycle is initiated wherein the throttle/brake PWM control signal is detected and processed to generate a positive DC voltage that is applied to the magnetic brake apparatus and braking action occurs. In one example and referring now again to FIG. 4, a user initiates a braking cycle using the radio transmitter 110. The controller 132 of the brake control module 130 of the magnetic brake control electronics 125 detects the braking PWM signal. The controller 132 processes the PWM signal and generate a positive DC voltage as shown, for example, in waveform 196a of FIG. 5. This positive DC voltage is applied to the electromagnetic coil 168 of the magnetic brake apparatus 160 and braking action occurs. Namely, when this positive DC voltage is applied to the electromagnetic coil 168, a magnetic field (flux) is created between the pot magnet 166 and the brake disc 172. This magnetic attraction pulls the brake disc 172 in contact with the face of the pot magnet 166 and electromagnetic coil 168. The friction (assisted by friction disc (or pad) 170) and the strength of the magnetic field causes the rotational motion of the brake disc 172 to stop or slow.

At step 325, the braking cycle is ended wherein the ending of the PWM control signal is detected and processed to generate a negative DC voltage or pulse that is applied to the magnetic brake apparatus to remove any remanent magnetic field and the braking action ends. In one example and referring now again to FIG. 4, a user ends the braking cycle using the radio transmitter 110. The controller 132 of the brake control module 130 of the magnetic brake control electronics 125 detects the ending of the braking PWM signal. The controller 132 processes the PWM signal and generates a negative DC voltage as shown, for example, in waveform 196a of FIG. 5 or a negative pulse as shown, for example, in waveform 196b of FIG. 5. This negative DC voltage or pulse is applied to the electromagnetic coil 168 of the magnetic brake apparatus 160 and braking action ends. Namely, in the absence of power to the electromagnetic coil 168, the magnetic field (flux) disappears and the brake disc 172 is released. Then, the application of the negative DC voltage or pulse serves to remove any remanent magnetic field in the pot magnet 166 and/or the brake disc 172 and the braking action ends. The removal of the remanent magnetic field ensures that the brake disc 172 rapidly and fully disengages from the face of the pot magnet 166 and the electromagnetic coil 168 and ensures that no drag occurs when ending the braking cycle.

Figure 24A:
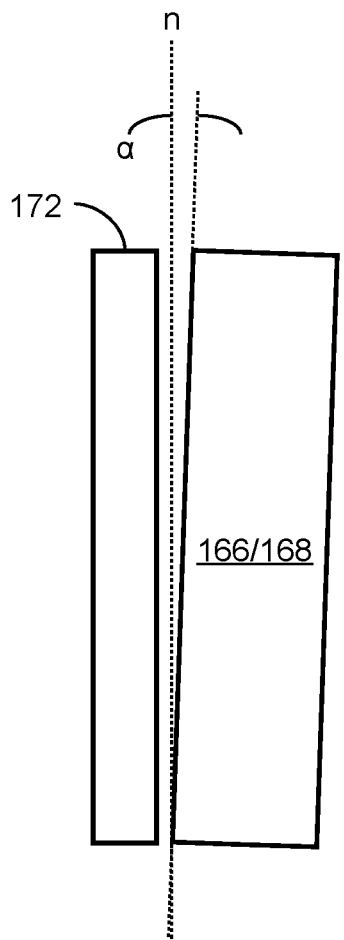
FIG. 24A and FIG. 24B illustrate side views of a portion of an exemplary magnetic brake apparatus and showing an electromagnet in relation to a brake disc.
Figure 24B:
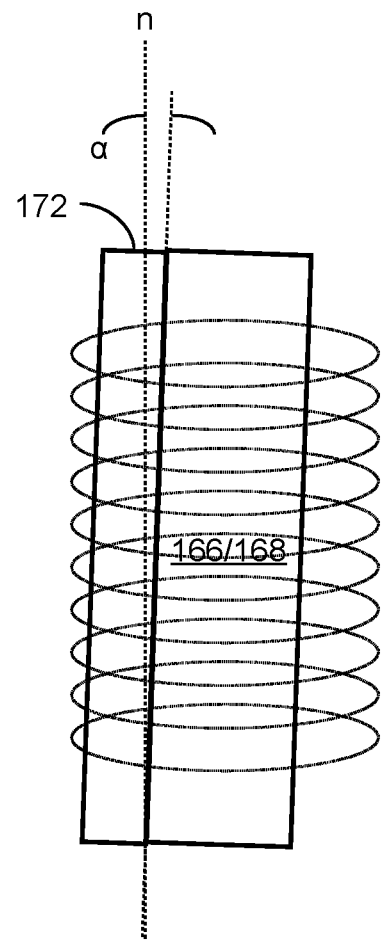

FIG. 24A and FIG. 24B illustrate side views of a portion of an exemplary magnetic brake apparatus and showing an electromagnet in relation to a brake disc. In the present embodiment shown, the magnetic brake apparatus 160 and showing the pot magnet 166 and the electromagnetic coil 168 in relation to the brake disc 172. In the magnetic brake apparatus 160, if we say that the face of the brake disc 172 is at normal n when spinning, then the face of the pot magnet 166 and the electromagnetic coil 168 are set at a slight tilt or angle α (e.g., from about 0-5 degrees) with respect to normal n. FIG. 24A shows the magnetic brake apparatus 160 when not activated and with no braking force (i.e., not magnetic field (flux)) present. In this state, when spinning the face of the brake disc 172 does not run fully parallel to the magnet face. However, FIG. 24B shows that when power is applied the brake disc 172 pulls flat to the face of the magnet and braking occurs. In the magnetic brake apparatus 160, the tilt or angle α of the pot magnet 166 and the electromagnetic coil 168 is optional.

Because the face of the pot magnet 166 and the electromagnetic coil 168 are set at a slight tilt or angle α with respect to normal n, when the voltage is released the brake disc 172 tends to pull away from the magnet because of the gyroscopic nature of the disc while spinning. In combination with the reverse pulse of the magnet, this tilted magnet configuration further ensures that the brake disc 172 disengages from the magnet and further ensures good braking control and response. In other embodiments, the magnetic brake apparatus 160 may include other mechanisms, such as a spring, for helping to release the brake disc 172 from the magnet.

Referring back to FIG. 1 through FIG. 24B, certain features of the presently disclosed magnetically-braked RC model vehicle 100 and namely of the magnetic brake control electronics 125 and the magnetic brake apparatus 160 are not limited to RC model vehicle applications only. In one example, the application of the negative DC voltage or negative pulse at the ending of the magnetic braking cycle to remove any remnant magnetic field may be useful in other applications that use electromagnetic brakes. In another example, the tilted magnet configuration may be useful in other applications that use electromagnetic brakes. Other applications that use electromagnetic brakes may include, but are not limited to, light electric vehicles (LEV) and industrial, commercial, and/or manufacturing equipment and/or processes.

Figure 25:
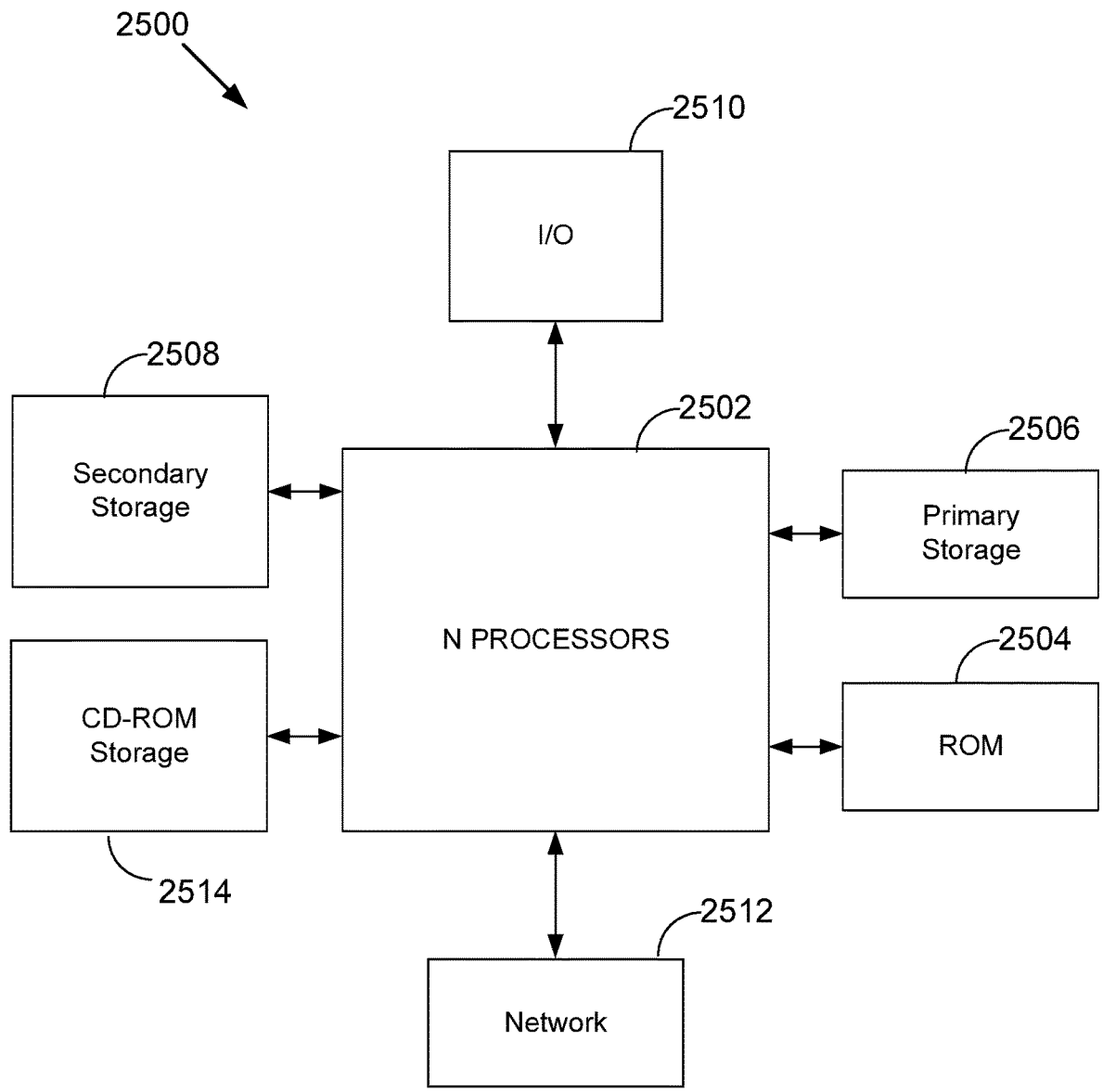
FIG. 25 illustrates a typical computer system that, when appropriately configured or designed, can serve as a computer system in which the present invention may be embodied; and, FIG. 26 is a block diagram depicting an exemplary brake software control module, in accordance with an embodiment of the present invention.

FIG. 25 illustrates a typical computer system that, when appropriately configured or designed, can serve as a computer system in which the present invention may be embodied. In the present embodiment shown, a communication system 2500 includes a multiplicity of clients with a sampling of clients denoted as a client CPU/MCU 2502 and a client 2504, a multiplicity of local networks with a sampling of networks denoted as a local network 2506 and a local network 2508, a global network 2510 and a multiplicity of servers with a sampling of servers denoted as a server 2512 and a server 2514. Clients may include magnetically-braked RC model vehicles 100. Servers may include radio transmitters 110.

Client 2502 may communicate bi-directionally with local network 2506 via a communication channel 2516. Client 2504 may communicate bi-directionally with local network 2508 via a communication channel 2518. Local network 2506 may communicate bi-directionally with global network 2510 via a communication channel 2520. Local network 2508 may communicate bi-directionally with global network 2510 via a communication channel 2522. Global network 2510 may communicate bi-directionally with server 2512 and server 2514 via a communication channel 2524. Server 2512 and server 2514 may communicate bi-directionally with each other via communication channel 2524. Furthermore, clients 2502, 2504, local networks 2506, 2508, global network 2510 and servers 2512, 2514 may each communicate bi-directionally with each other.

CPU 2502 may be comprised of a single processor or multiple processors. CPU 2502 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

Figure 26:
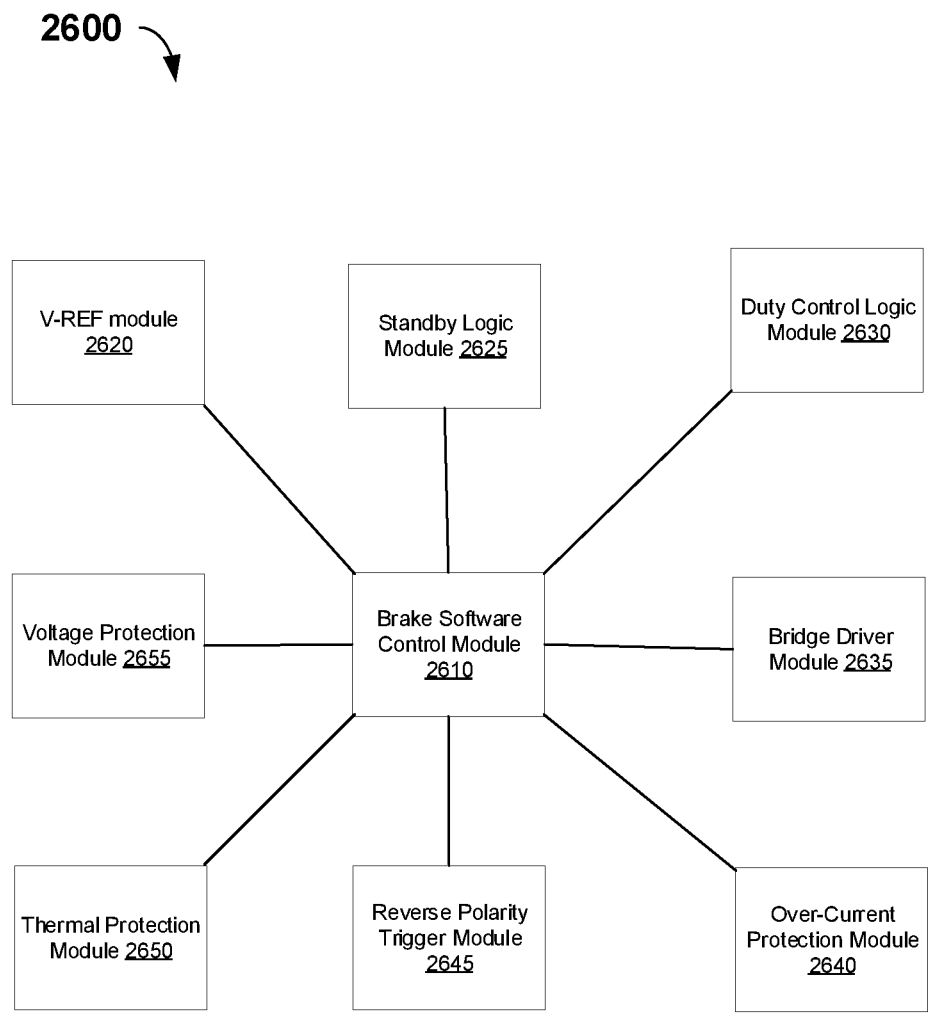

FIG. 26 is a block diagram depicting an exemplary brake software system that may execute the control and behavior of the method embodiment of FIG. 27, in accordance with an embodiment of the present invention. Referring also to FIGS. 4 and 26, in the present embodiment shown in FIG. 27, a brake software control module 2610 is stored and executed in controller 132 in magnetic brake control electronics 125, which software control module 2610 may include programmable logic devices and/or memory devices for storing software control program. The software control program may comprise of several modules, each software module performing a corresponding control function, including Steps 315-325 of the method embodiment shown in FIG. 23. The present brake software system may include a standby logic module 2625 which executes software code that enables manually or automatically invoking sleep mode when the brake control module is not in use. The present brake software system may also include a voltage protection module 2655, a thermal protection module 2650, a duty control module 2630, a (full-bridge) driver module 2635, an over-current protection module 2640, and a reverse polarity trigger module 2645, each being configured to execute software code that enables the functions and behavior as described for the respective hardware modules shown and described in connection with FIG. 4. Those skilled in the art will readily recognize that depending upon the needs of the particular application, some, if not most, of these software (and respective hardware) modules are optional and may not be required or present in other embodiments of the present invention. For example, when the various protection functions are not desired they may be omitted. The software control system program may be, but not a limitation, a stand-alone software program. The software control program may have, but not a limitation, internet access capabilities.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Further, the presently disclosed magnetically-braked RC model vehicle 100 provides a simple, low-cost, and easy to maintain brake apparatus (e.g., the magnetic brake apparatus 160) as compared with conventional mechanical and/or hydraulic brake systems used in RC model vehicles. Additionally, in the presently disclosed magnetic brake apparatus 160, about 100 percent of the brake disc surface area is utilized for braking as compared with only about 20 percent of the brake disc surface area used in conventional mechanical and/or hydraulic brake systems.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Further, in other embodiments, the presently disclosed magnetic brake apparatus 160 can be retrofitted into any existing RC model vehicle.

The following claims are hereby incorporated into the detailed description, with each claim standing on its own as a separate embodiment.

What is claimed is:

1. A system comprising:
a magnetic brake apparatus, said magnetic brake apparatus is configured to be operable for slowing or stopping motion of an RC model vehicle with at least one of, a magnetic field, a magnetic flux, a magnetic attraction, and electromagnetic force, in which said magnetic brake apparatus comprises:
a pot magnet;
a brake disc;
a friction disc that is configured to be operable for slowing or stopping motion of the RC model vehicle with said at least one of, a magnetic field, a magnetic flux, a magnetic attraction, and electromagnetic force; and
an electromagnetic coil appliance, said electromagnetic coil appliance is configured to be operable for generating said at least one of, a magnetic field, a magnetic flux, a magnetic attraction, and electromagnetic force when power is applied to said electromagnetic coil appliance, wherein said at least one of, a magnetic field, a magnetic flux, a magnetic attraction, and electromagnetic force is applied between said pot magnet and brake disc;
a brake control module, said brake control module is configured to be operable for controlling said magnetic brake apparatus, in which said magnetic control module comprises:
a controller implement, said controller implement is configured to be operable for processing a program instruction to control an operation of said magnetic brake apparatus;
a full-bridge driver coupled to said controller implement, said full-bridge driver is configured to be operable for at least one of, applying power and driving said electromagnetic coil appliance; and
a receiver device, said receiver device is into electrical engagement with said magnetic brake apparatus, wherein said receiver is configured to be operable for supplying a control signal to said controller implement.

2. The system of claim 1, wherein said receiver device is configured to supply a control signal to said controller implement, and wherein said at least one of, a magnetic field, a magnetic flux, a magnetic attraction, and electromagnetic force generated is configured to be operable for pulling said brake disc against a surface of said pot magnet.

3. The system of claim 2, in which said magnetic brake apparatus further comprises a temperature sensor implement, wherein said temperature sensor implement is configured to be operable for adjusting power applied to said electromagnetic coil appliance to generally limit a braking force based on a temperature of said magnetic brake apparatus.

4. The system of claim 3, in which said brake control module further comprises a hall effect sensor that is configured to be operable for monitoring an amount of said at least one of, a magnetic field, a magnetic flux, and magnetic attraction generated.

5. The system of claim 4, further comprising at least a reverse polarity trigger implement, wherein said reverse polarity trigger implement is configured to be operable for generally reducing or eliminating a remanent magnetic field generated in said magnetic brake apparatus and thereby ensuring said brake disc disengages from said at least one of, a magnetic field, a magnetic flux, a magnetic attraction, and electromagnetic force.

6. The system of claim 2, in which said magnetic brake apparatus further comprises:
a bulkhead housing, wherein said bulkhead housing is configured to be operable for mounting said magnetic brake apparatus;
a disc guide disposed to said bulkhead housing; and
an outdrive coupler.

7. The system of claim 6, in which said receiver device is further configured to supply a Pulse Width Modulation (PWM) control signal to said controller implement, wherein said controller implement comprises a forward polarity input that is configured to receive said PWM control signal from said receiver device to remove remanence.

8. The system of claim 7, in which said controller implement further comprises a reverse polarity input that is configured to receive a reverse or braking PWM control signal from a reverse polarity trigger, wherein said PWM control signal is converted to a reverse or braking PWM control signal by said reverse polarity trigger, and wherein said reverse or braking PWM control signal is configured to slow or stop motion of an RC model vehicle with said at least one of, a magnetic field, a magnetic flux, a magnetic attraction, and electromagnetic force.

9. The system of claim 8, in which said program instruction comprises a plurality of software modules, each software module configured to be operable for performing a control function.

10. The system of claim 9, in which said brake control module further comprises a thermal protection that is configured to be operable for providing thermal shut down protection to prevent the controller implement or said brake control module from overheating.

11. The system of claim 10, in which said brake control module further comprises a duty control configured to be operable for providing an analog DC voltage input to said controller implement, wherein said analog DC voltage controls a duty cycle of an internal PWM part of said controller implement.

12. The system of claim 11, in which said magnetic brake apparatus further comprises at least two or more magnetic brake apparatus and in which said brake control module further comprises at least two or more brake control modules corresponding to said at least two or more magnetic brake apparatus.

13. The system of claim 2, in which said system further comprises a one-channel control electronics where said magnetic brake apparatus further comprises at least two or more magnetic brake apparatus and in which said brake control module further comprises at least two or more brake control modules corresponding to said at least two or more magnetic brake apparatus.

14. The system of claim 13, wherein a first and second magnetic brake apparatuses are controlled by corresponding first and second brake control modules via one Pulse Width Modulation (PWM) control channel with a Pulse Width Modulation (PWM) control signal generated from said receiver device.

15. The system of claim 14, wherein each of said controller implement of said first brake control module and said controller implement of said second brake control module comprises a forward polarity input that is configured to receive said PWM control signal generated from said receiver device to remove remanence.

16. The system of claim 15, in which each of said controller implement further comprises a reverse polarity input that is configured to receive a reverse or braking PWM control signal from at least one reverse polarity trigger, wherein said PWM control signal is converted to a reverse or braking PWM control signal by said reverse polarity trigger, and wherein said reverse or braking PWM control signal is configured to slow or stop motion of said RC model vehicle with said at least one of, a magnetic field, a magnetic flux, a magnetic attraction, and electromagnetic force.

17. A system comprising:
means for applying a braking force to a vehicle, to stop or slow down a motion of the vehicle, with at least one of, a magnetic field, a magnetic flux, a magnetic attraction, and electromagnetic force;
means for generating said at least one of, a magnetic field, a magnetic flux, a magnetic attraction, and electromagnetic force when power is applied to said generating means;
means for controlling said brake applying means;
means for providing power to said at least one of, a magnetic field, a magnetic flux, a magnetic attraction, and electromagnetic force generating means;
means for supplying a control signal to said controlling means;
means for adjusting power applied to said electromagnetic coil appliance to generally limit a braking force based on a temperature of said magnetic brake apparatus;
means for monitoring an amount of said at least one of, a magnetic field, a magnetic flux, and magnetic attraction generated.

18. A system comprising:
a magnetic brake apparatus, said magnetic brake apparatus is configure to be operable for applying a braking force to a vehicle, to stop or slow down a motion of the vehicle with at least one of, a magnetic field, a magnetic flux, a magnetic attraction, and electromagnetic force, in which said magnetic brake apparatus comprises;
a pot magnet;
a brake disc;
an electromagnetic coil appliance, said electromagnetic coil appliance is configured to be operable for generating said at least one of, a magnetic field, a magnetic flux, a magnetic attraction, and electromagnetic force when power is applied to said electromagnetic coil appliance, wherein said at least one of, a magnetic field, a magnetic flux, a magnetic attraction, and electromagnetic force is applied between said pot magnet and brake disc;
wherein said at least one of, a magnetic field, a magnetic flux, a magnetic attraction, and electromagnetic force generated is configured to be operable for pulling said brake disc against a surface of said pot magnet to effect said braking force;
a bulkhead housing, wherein said bulkhead housing is configured to be operable for mounting said magnetic brake apparatus to a vehicle;
a brake control module, said brake control module is configured to be operable for controlling said magnetic brake apparatus, in which said magnetic control module comprises; a controller implement, said controller implement is configured to be operable for processing a program instruction to control an operation of said magnetic brake apparatus; and
a full-bridge driver coupled to said controller implement, said full-bridge driver is configured to be operable for at least one of, applying power and driving said electromagnetic coil appliance;
a receiver device, said receiver device is into electrical engagement with said magnetic brake apparatus, wherein said receiver is configured to be operable for supplying a control signal to said controller implement;
a temperature sensor implement, wherein said temperature sensor implement is configured to be operable for adjusting said power applied to said electromagnetic coil appliance to generally limit said braking force based on a temperature of said magnetic brake apparatus;
a hall effect sensor that is configured to be operable for monitoring an amount of said at least one of, a magnetic field, a magnetic flux, and magnetic attraction generated.

19. The system of claim 18, further comprising at least a reverse polarity trigger implement, wherein said reverse polarity trigger implement is configured to be operable for generally reducing or eliminating a remanent magnetic field generated in said magnetic brake apparatus and thereby ensuring said brake disc disengages from said at least one of, a magnetic field, a magnetic flux, a magnetic attraction, and electromagnetic force.

* * * * *